United States Patent
Lim et al.

(10) Patent No.: US 8,514,830 B2
(45) Date of Patent: Aug. 20, 2013

(54) METHOD FOR TRANSCEIVING A SIGNAL IN WIRELESS COMMUNICATION SYSTEM

(75) Inventors: Dong Guk Lim, Gyeonggi-do (KR); Sung Ho Moon, Gyeonggi-do (KR); Han Gyu Cho, Gyeonggi-do (KR); Yeong Hyeon Kwon, Gyeonggi-do (KR); Jin Sam Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 537 days.

(21) Appl. No.: 12/752,594

(22) Filed: Apr. 1, 2010

(65) Prior Publication Data
US 2010/0254367 A1 Oct. 7, 2010

Related U.S. Application Data

(60) Provisional application No. 61/166,252, filed on Apr. 3, 2009, provisional application No. 61/173,214, filed on Apr. 28, 2009, provisional application No. 61/218,047, filed on Jun. 17, 2009.

(30) Foreign Application Priority Data

Jul. 24, 2009 (KR) .................. 10-2009-0067849

(51) Int. Cl.
*H04B 7/208* (2006.01)
*H04J 11/00* (2006.01)
*H04J 3/00* (2006.01)

(52) U.S. Cl.
USPC ........................ 370/344; 370/208; 370/280

(58) Field of Classification Search
USPC ......... 370/208–210, 465, 470, 472, 474–479, 370/280
See application file for complete search history.

(56) References Cited

U.S. PATENT DOCUMENTS

2007/0280098 A1* 12/2007 Bhatt et al. .................. 370/208
2010/0177669 A1* 7/2010 Suo et al. .................... 370/280

FOREIGN PATENT DOCUMENTS

WO 2006/000091 1/2006

OTHER PUBLICATIONS

Document name: IEEE 802.16m-08/003r7 Title: IEEE 802.16m System Description Document Author/source: Shkumbin Hamiti date: Feb. 7, 2009 Publisher: IEEE Pages: entire document.*

(Continued)

*Primary Examiner* — Ian N Moore
*Assistant Examiner* — Kiet Tang
(74) *Attorney, Agent, or Firm* — Lee, Hong, Degerman, Kang & Waimey

(57) ABSTRACT

A method of transmitting a signal using a prescribed frame structure in a wireless communication system is disclosed. A mobile station is able to transmit or receive a signal using a frame structure with a CP length corresponding to ¼ of a useful symbol. Moreover, the mobile station is able to transmit or receive a signal using a frame structure with a CP length corresponding to ¼ of a useful symbol, which is designed to mutually coexist without causing collision or interference with another frame structure with a different CP length. In this case, a channel bandwidth of the prescribed frame structure is 8.75 MHz.

11 Claims, 24 Drawing Sheets

(56) References Cited

OTHER PUBLICATIONS

Document name: IEEE 802.16m-09/0010r1a (working document) Mar. 2008 Title: Part 16: Air Interface for Fixed and Mobile Broadband Wireless Access System Author/Chair: Roger B. Marks Document Date: Mar. 2008, Published Date: Mar. 31, 2009 Publisher: IEEE Pages: entire document.*

Document No. L80216-10_0002 Title: Overview of IEEE P802.16m techcology and Candidate RIT for IMT-Advanced Author: IEEE 802.16 IMT-Advanced Evaluation Group Date: Jan. 13, 2010 Publisher: IEEE Pages: entire document.*

The State Intellectual Property Office of the People's Republic of China Application Serial No. 201010159433.3, Office Action dated May 14, 2013, 6 pages.

* cited by examiner

METHOD FOR TRANSCEIVING A SIGNAL IN WIRELESS COMMUNICATION SYSTEM

CROSS-REFERENCE TO RELATED APPLICATIONS

Pursuant to 35 U.S.C. §119, this application claims the benefit of earlier filing date and right of priority to Korean application No. 10-2009-0067849, filed on Jul. 24, 2009 and also claims the benefit of U.S. Provisional Application Nos. 61/166,252, filed on Apr. 3, 2009, 61/173,214, filed on Apr. 28, 2009, and 61/218,047, filed on Jun. 17, 2009, the contents of which are all hereby incorporated by reference herein in their entireties.

BACKGROUND OF THE INVENTION

1. Field of the Invention

The present invention relates to a signal transmitting method, and more particularly, to a method of transmitting a signal in a wireless communication system using a prescribed frame structure.

2. Discussion of the Related Art

Generally, IEEE 802.16m system is able to support FDD (frequency division duplex) including H-FDD (half-frequency division duplex) mobile station operation and TDD time division duplex) both. The IEEE 802.16m system uses OFDMA (orthogonal frequency division multiplexing access) as a multiple access scheme in DL (downlink) and UL (uplink). Contents for OFDMA parameters are shown in Table 1.

MHz and 20 MHz, each of the 5 ms radio frames is constructed with eight subframes. One subframe can be allocated for downlink or uplink transmission. A first type can be defined as a subframe including 6 OFDMA symbols. A second type can be defined as a subframe including 7 OFDMA symbols. And, a third type can be defined as a subframe including 5 OFDMA symbols.

A basic frame structure, is applicable to FDD including H-FDD mobile-station operation and TDD both. The number of switching points in each radio frame of TDD system is 2. The switching point can be defined according to a change of directionality from downlink to uplink or uplink to downlink.

H-FDD mobile station can be included in FDD system. A frame structure in viewpoint of the H-FDD mobile station is similar to a TDD frame structure. Yet, downlink and uplink transmissions occur in two individual frequency bands. Transmission gaps between downlink and uplink (and vice versa) are requested to switch transmitting and receiving circuits to each other.

FIG. 2 is a diagram for an example of TDD frame having a DL-to-UL ratio set to 5:3.

Referring to FIG. 2, assuming that an OFDMA symbol duration is 102.857 μs and that a CP (cyclic prefix) length is set to a length corresponding to ⅛ of a useful symbol length (Tu), lengths of first and second type subframes are 0.617 ms and 0.514 ms, respectively. A last DL (downlink) subframe SF4 is a subframe of a third type. And, a TTG (transmit transition gap) and an RTG (receive transition gap) are set to 105.714 μs and 60 μs, respectively. According to another numerology, the number of subframes per frame and the number of symbols within a subframe may be different.

TABLE 1

| Nominal Channel Bandwidth (MHz) | | | 5 | 7 | 8.75 | 10 | 20 |
|---|---|---|---|---|---|---|---|
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT Size | | | 512 | 1024 | 1024 | 1024 | 2048 |
| Sub-Carrier Spacing (kHz) | | | 10.937500 | 7.812500 | 9.765625 | 10.937500 | 10.937500 |
| Useful Symbol Time $T_u$ (μs) | | | 91.429 | 128 | 102.4 | 91.429 | 91.429 |
| Cyclic Prefix (CP) $T_g = ⅛ T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $T_g = 1/16 T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $T_g = ¼ T_u$ | Symbol Time $T_s$ (μs) | | 114.286 | [TBD] | [TBD] | 114.286 | 114.286 |
| | FDD | Number of OFDM symbols per Frame | 43 | [TBD] | [TBD] | 43 | 43 |
| | | Idle time (μs) | 85.694 | [TBD] | [TBD] | 85.694 | 85.694 |
| | TDD | Number of OFDM symbols per Frame | 42 | [TBD] | [TBD] | 42 | 42 |
| | | TTG + RTG (μs) | 199.98 | [TBD] | [TBD] | 199.98 | 199.98 |

In the following description, a frame structure of the IEEE 802.16m system is schematically explained.

FIG. 1 is a diagram of a basic frame structure in IEEE 802.16m system.

Referring to FIG. 1, each 20 ms super frame is divided into four 5 ms radio frames equal to each other in size. And, the corresponding super frame starts with a super frame header (SFH). In case of using the same OFDMA parameters of Table 1 within a channel bandwidth selected from 5 MHz, 10

FIG. 3 is a diagram for an example of a frame structure in FDD system.

Referring to FIG. 3, a base station supporting FDD system is able to simultaneously support half-duplex mobile station operating with a same RF carrier and a full-duplex mobile station both. A mobile station supporting FDD system should use either H-FDD system or FDD system. All subframes are available for both DL and UL transmissions. The DL and UL transmissions can be discriminated from each other in frequency domain. One super frame is divided into 4 frames. And, one of the frames includes 8 subframes.

FIG. 4 is a diagram for TDD and FDD frame structures with CP length corresponding to 1/16 of a useful symbol length (Tu).

Referring to FIG. 4, a frame of IEEE 802.16m system, which has a CP length corresponding to 1/16 of a useful symbol length (Tu) for channel bandwidths of 5 MHz, 10 MHz and 20 MHz, includes 5 first type subframes and 3 second type subframes in FDD system or includes 6 first type subframes and 2 second type subframes in TDD system.

Assuming that an OFDMA symbol duration is 97.143 μs and that a CP (cyclic prefix) length is set to a length corresponding to 1/16 of a useful symbol length (Tu), lengths of the first and second type subframes are 0.583 ms and 0.680 ms, respectively. And, a TTG (transmit transition gap) and an RTG (receive transition gap) are set to 82.853 μs and 60 μs, respectively. According to another numerology, the number of subframes per frame and the number of symbols within a subframe may be different.

As mentioned in the foregoing description, in the IEEE 802.16m system, OFDMA parameters and frame structures for channel bandwidths of 5 MHz, 10 MHz and 20 MHz are only defined for a case that a CP length is 1/8 Tb and a case that a CP length is 1/16 Tb. Namely, a frame structure for a case that a CP length is 1/4 Tb has not been proposed so far.

A frame structure with a CP length of 1/4 Tb may cause a problem with a previous frame structure with a CP length of 1/8 or 1/16 Tb that interference is generated from a switching point between downlink and uplink. However, a new frame structure enabling mutual co-existence by solving this problem has not been proposed so far.

In the IEEE 802.16m system, OFDMA parameters and frame structures of 1/8 Tb and 1/16 Tb are defined for 8.75 MHz band only but definition has not been made for 1/4 Tb yet. When a frame structure with a CP length of 1/4 Tb is used, if an idle interval for TTG/RTG is set in a conventional manner, it may cause a problem that this interval becomes smaller than TTG/RTG of a frame structure with a different CP length (1/8 Tb or 1/16 Tb). Therefore, this problem needs to be solved.

SUMMARY OF THE INVENTION

Accordingly, the present invention is directed to a method of transmitting a signal in a wireless communication system that substantially obviates one or more problems due to limitations and disadvantages of the related art.

An object of the present invention is to provide a method of transmitting a signal in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transceiving a signal using a frame structure in a wireless communication system, the method includes the steps of transceiving a signal through a frame according to the frame structure, wherein the frame comprises 6 subframes, and the 6 subframes comprise at least one of a first type subframe including 6 OFDMA (orthogonal frequency division multiple access) symbols or a second type subframe including 7 OFDMA symbols.

Preferably, the frame is a TDD (time division duplex) frame or an FDD (frequency division duplex) frame.

More preferably, the TDD frame includes a downlink interval and an uplink interval subsequent to the downlink interval, and the wherein the first type subframe is located at a first downlink subframe of the downlink interval and a first uplink subframe of the uplink interval.

In this case, the second type subframe is located at a second downlink subframe of the downlink and a second uplink subframe of the uplink interval.

And, a TTG (transmit transition gap) is located between the downlink interval and the uplink interval in the TDD frame, and wherein an RTG (receive transition gap) is located next to a last subframe of the uplink interval in the TDD frame. Moreover, the TDD frame includes 4 first type subframes and 2 second type subframes. Besides, a ratio of a number of DL subframes to a number of UL subframes in the TDD frame is set to one of 5:1, 4:2, 3:3 and 2:4.

More preferably, the second type subframe in the FDD frame is located in the same order of a last downlink subframe located in the TDD frame.

In this case, the second type subframe is located at a fourth subframe in the FDD frame. And, the FDD frame includes 3 first type subframes and 3 second type subframes. Moreover, an idle time is located next to a last subframe in the FDD frame.

Preferably, the frame comprises a CP (cyclic prefix), a length of the CP is set to 1/4 of a useful symbol length.

Preferably, a channel bandwidth of the frame is set to 8.75 MHz.

In another aspect of the present invention, a apparatus for transceiving a signal using a frame structure in a wireless communication system, the apparatus includes transceiving module for transceiving a signal through a frame according to the frame structure, wherein the frame comprises 6 subframes, and the 6 subframes comprise at least one of a first type subframe including 6 OFDMA (orthogonal frequency division multiple access) symbols or a second type subframe including 7 OFDMA symbols.

Accordingly, the present invention provides the following effects and/or advantages.

First of all, the present invention enables a signal to be transmitted/received using a TDD frame structure with a CP length corresponding to 1/4 of a useful symbol length and an FDD frame structure with commonality with the TDD frame structure.

Secondly, the present invention is able to transmit/receive a signal using a TDD frame structure that can coexist together with another TDD frame structure with a different CP length.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
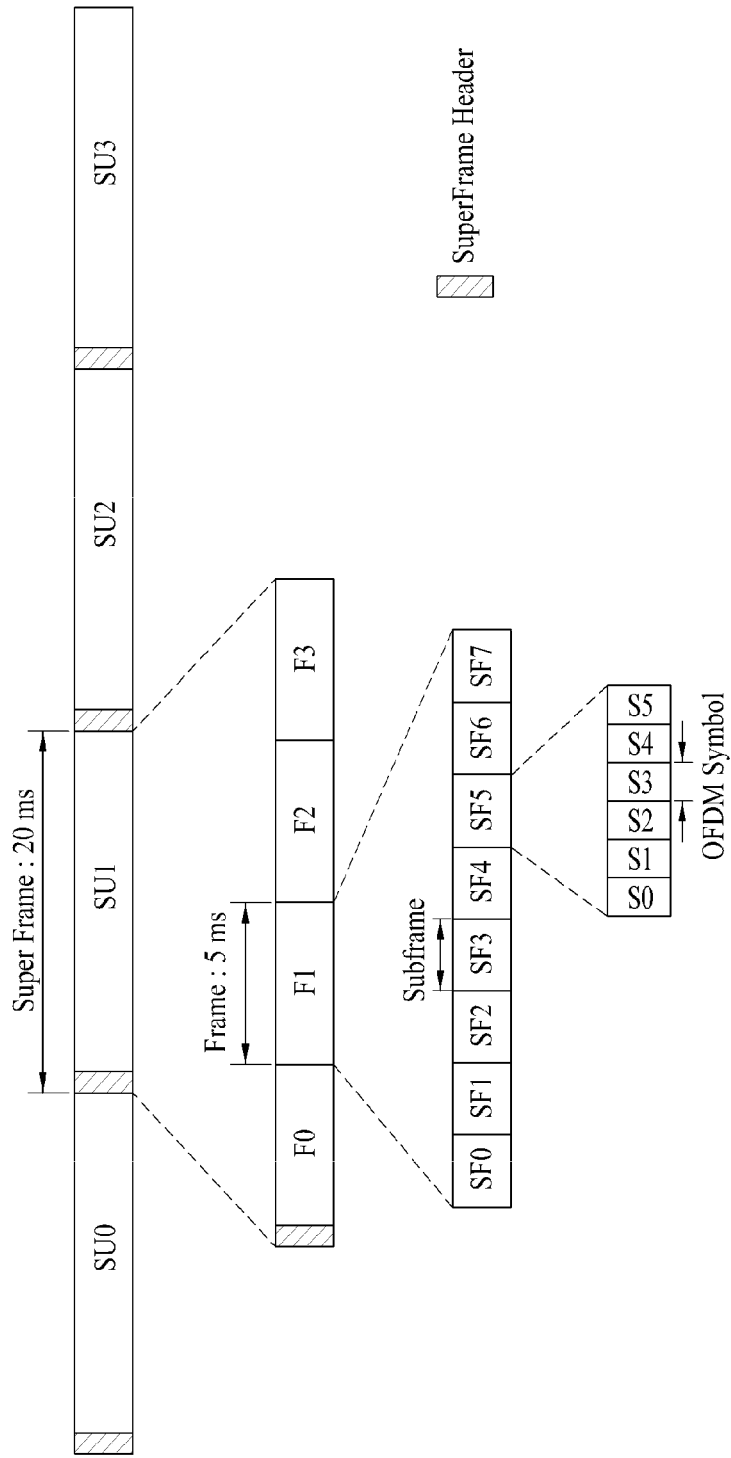
FIG. 1 is a diagram of a basic frame structure in IEEE 802.16m system.
Figure 2:
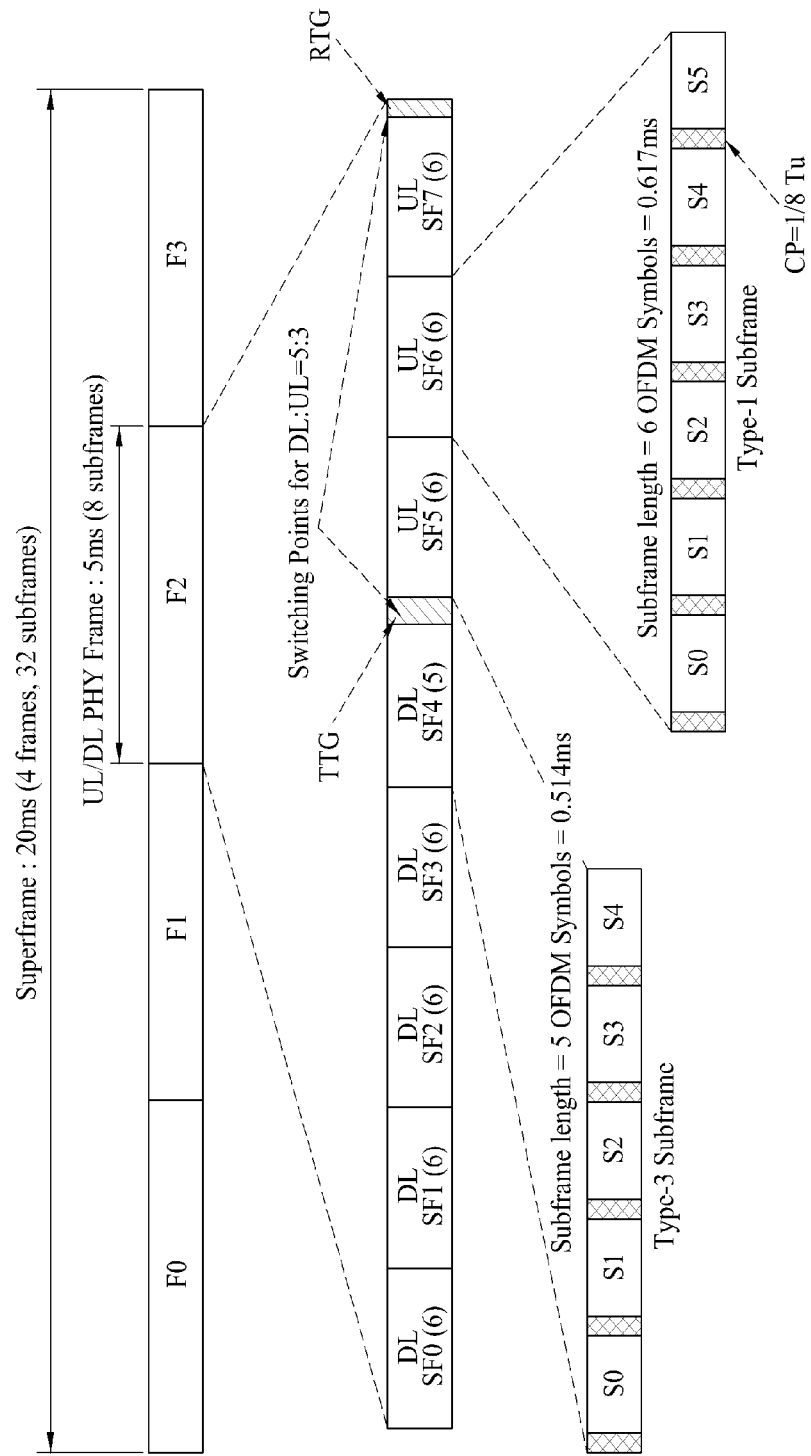
FIG. 2 is a diagram for an example of TDD frame having a DL-to-UL ratio set to 5:3.
Figure 3:
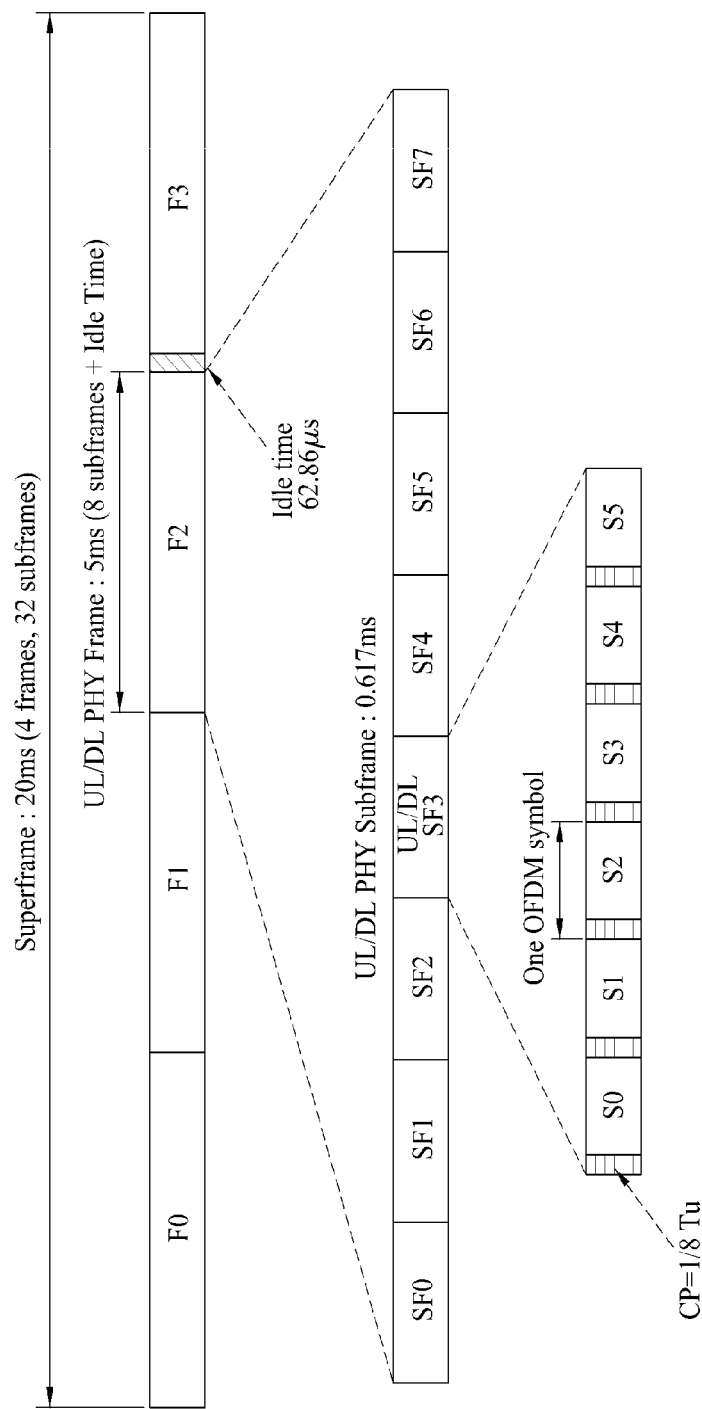
FIG. 3 is a diagram for an example of a frame structure in FDD system.
Figure 4:
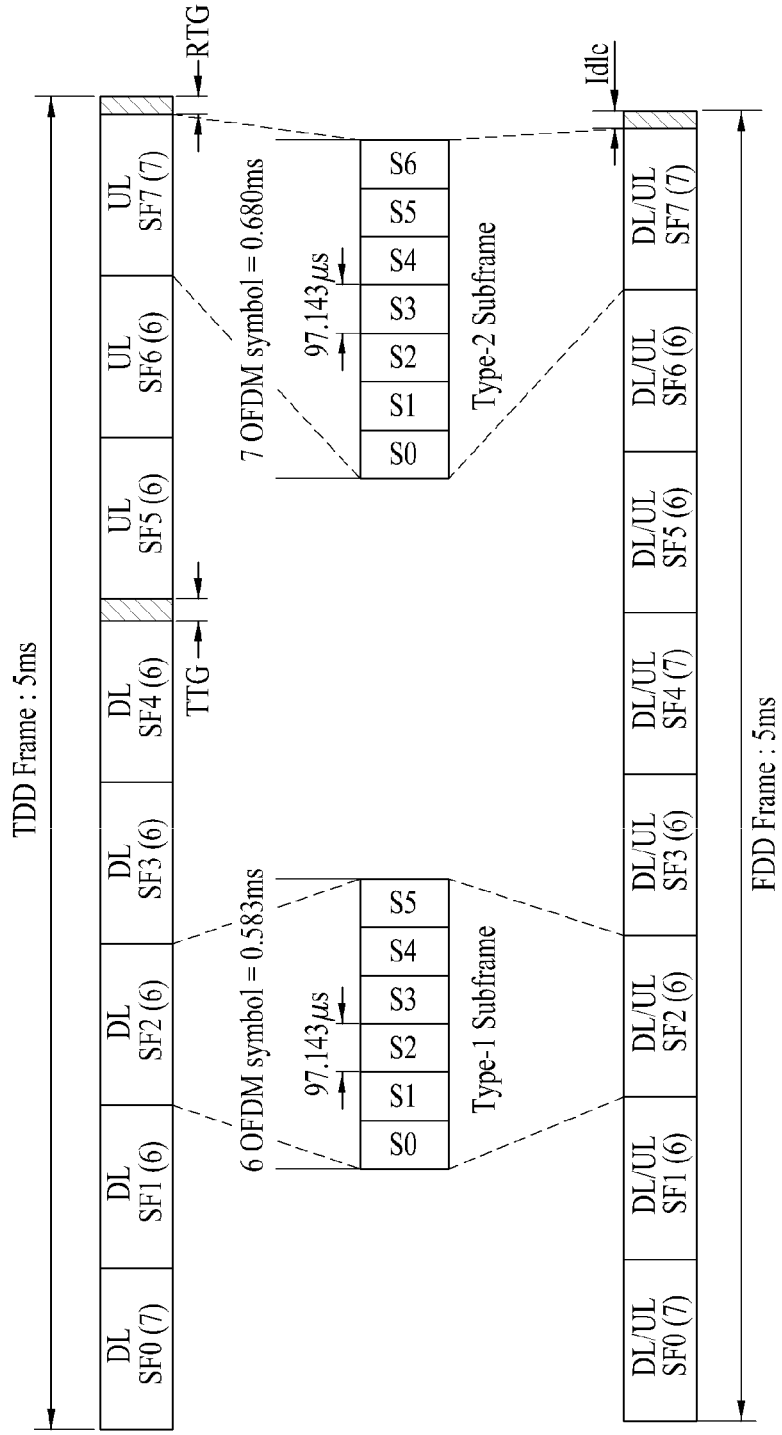
FIG. 4 is a diagram for TDD and FDD frame structures with CP length corresponding to 1/16 of a useful symbol length (Tu)

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made centering on predetermined terminologies, they need not to be limited to the terminologies. If the following descriptions are made using random terminologies, the same meanings can be provided. Wherever possible, the same reference numbers will be used throughout the drawings to refer to the same or like parts.

Throughout this disclosure, if a prescribed part 'includes' a prescribed element, it means that another element can be further included instead of eliminating other elements as long as absence of special objection.

The following descriptions are applicable to various communication systems, which are capable of providing various communication services of audio data, packet data, and the like. The technology of the communication system is usable in DL (downlink) or UL (uplink). In this case, 'base station' can be replaced by such a terminology as a fixed station, a Node B, an eNode B (eNB), an access point, an ABS and the like. And, 'mobile station (MS)' can be replaced by such a terminology as a user equipment (UE), a subscriber station (SS), a mobile subscriber station (MSS), an AMS, a mobile terminal and the like.

A transmitting end means a node for transmitting data or audio service, and a receiving end means a node for receiving the data or audio service. Therefore, a mobile station becomes a transmitting end and a base station becomes a transmitting end, in uplink. Likewise, a mobile station becomes a receiving end and a base station becomes a receiving end, in downlink.

Meanwhile, a mobile station of the present invention can include a PDA (personal digital assistant), a cellular phone, a PCS (personal communication service) phone, a GSM (global system for mobile) phone, a WCDMA (wideband CMDA) phone, an MBS (mobile broadband system) phone or the like.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and P802.16m documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention. In the following description, specific terminologies used for embodiments of the present invention are provided to help the understanding of the present invention. And, the use of the specific terminology can be modified into another form within the scope of the technical idea of the present invention.

Basic principles of OFDM (orthogonal frequency division multiplexing), which are multi-carrier modulation scheme in wireless communication systems, are described as follows.

First of all, in OFDM system, a high-rate data stream is divided into a number of slow-rate data streams. This is to simultaneously transmit the data streams using a plurality of carriers. Each of a plurality of the carriers is called a subcarrier. Since orthogonality exists among a plurality of carriers in OFDM system, even frequency components of carriers are mutually overlapped with each other, they can be detected by a receiving end. A high-rate data stream is converted to a plurality of slow-rate data streams by a serial to parallel converter. A plurality of the data streams converted in parallel are multiplied by subcarriers, respectively and are then added together. The added data streams are transmitted to a receiving end.

A plurality of the parallel data streams generated by the serial to parallel converter can be carried on a plurality of subcarriers by IDFT (inverse discrete Fourier transform). In this case, it is able to efficiently implement the IDFT using IFFT (inverse fast Fourier transform). As a symbol duration of a slow-rate subcarrier increases, relative time-domain signal dispersion generated by multi-path delay spreading is reduced.

In wireless communication using this OFDM system, it is able to insert a guard interval longer than a delay spreading of channel between symbols in order to reduce inter-symbol interference. In particular, while each symbol is being transmitted on a multi-path channel, a guard interval longer than a maximum delay spread of channel is inserted between contiguous symbols. In doing so, in order to prevent inter-subcarrier orthogonality breakage, a signal in a last interval (i.e., a guard interval) of a useful symbol interval is copied and then inserted in a fore part of a symbol. This is called a cyclic prefix (hereinafter abbreviated CP).

Figure 5:
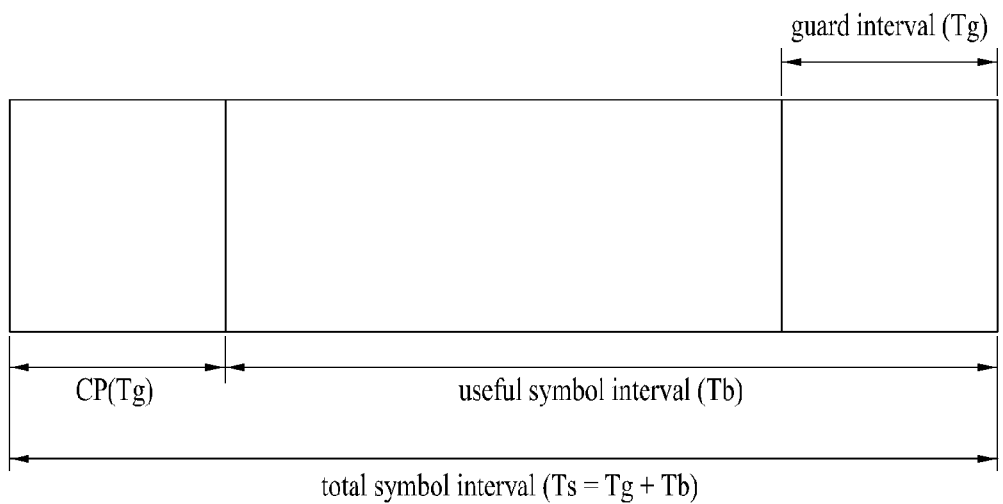
FIG. 5 is a diagram for an example of a symbol structure including a CP (cyclic prefix)
Figure 6:
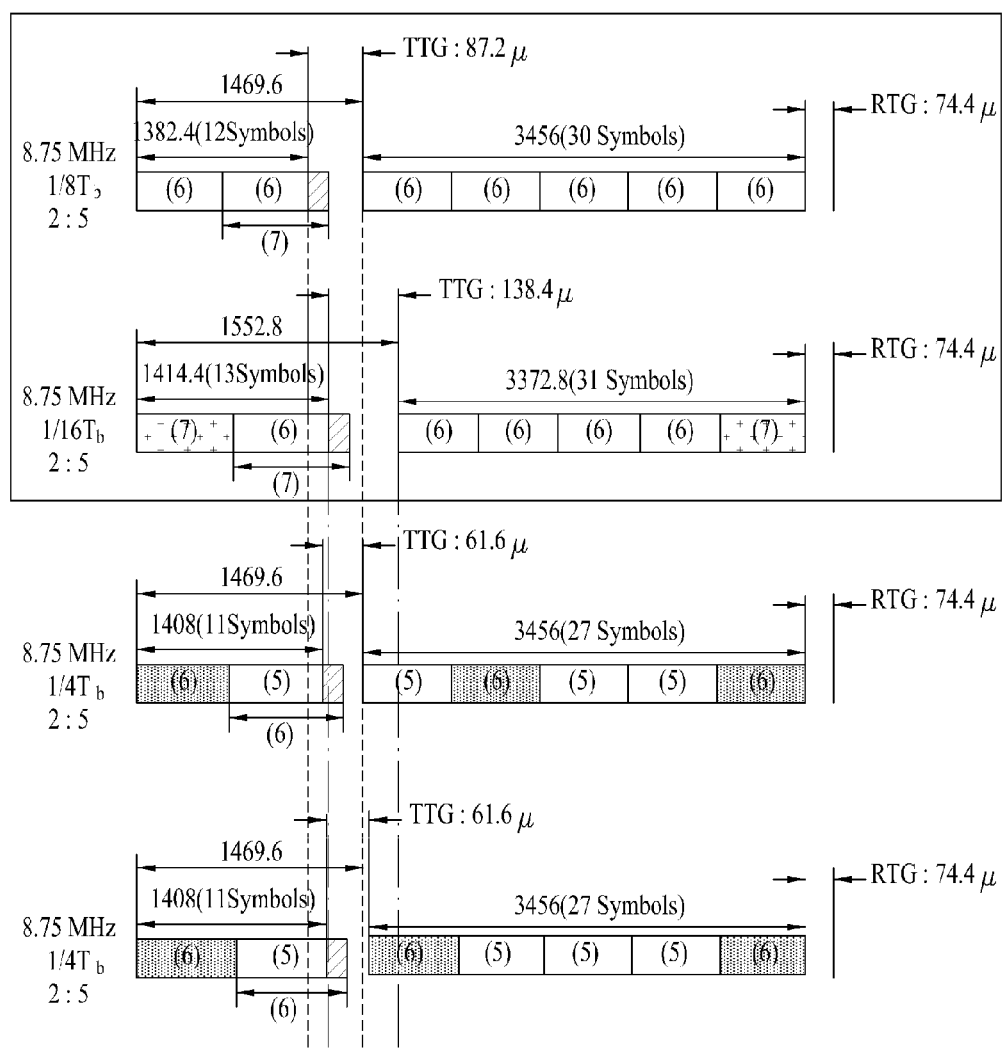
FIGS. 6 to 10 are diagrams for examples of a TDD frame structure with a CP length of 1/4 Tb, which can coexist together with another TDD frame structure with a different CP length, according to a ratio of the number of DL subframe numbers to the number of UL subframe numbers.
Figure 7:
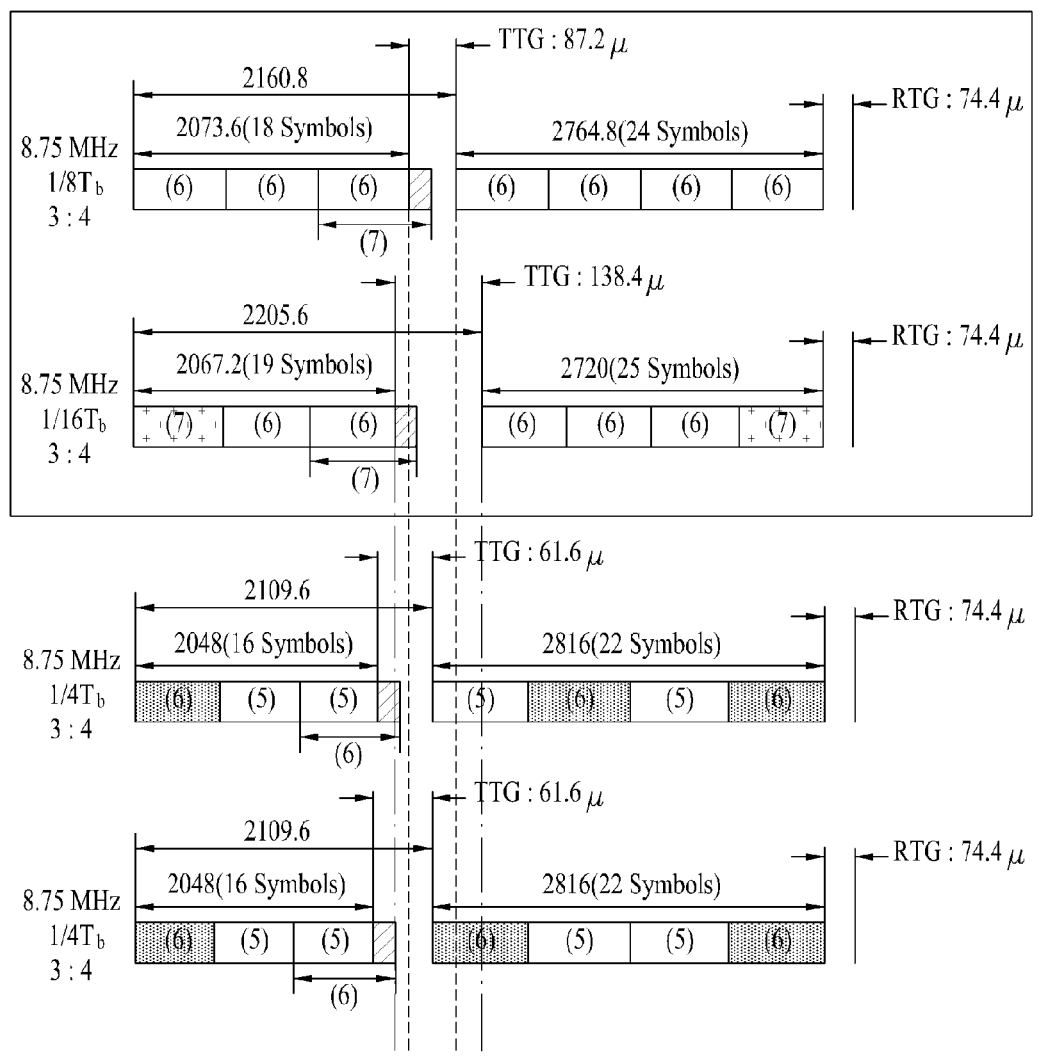

FIG. 5 is a diagram for an example of a symbol structure including a CP (cyclic prefix).

Referring to FIG. 5, a symbol duration Ts becomes a sum of a useful symbol interval Tb for carrying data actually and a guard interval Tg. A receiving end removes the guard interval and then performs demodulation by taking data for the useful symbol interval. A transmitting end and a receiving end may be synchronized with each other using a cyclic prefix code and the inter-data symbol orthogonality is maintained. In this case, a symbol of the present invention may be an OFDMA symbol.

In the following description, explained are frame structures (TDD frame and FDD frame) in 802.16m system with a CP length (hereinafter named a CP length of ¼ Tb) corresponding to ¼ of a useful symbol length on a channel bandwidth of 8.75 MHz. And, a TDD frame structure, which can mutually coexist with a TDD frame structure with a CP length of ⅛ or 1/16 Tb for the same channel bandwidth of 8.75 MHz, will be explained. Moreover, an FDD frame structure with many commonalities with a TDD frame structure proposed by the present invention is explained as well.

In IEEE 802.16m system, subframes of 4 kinds of types exist. Theses types can be defined as follows. First of all, a first type subframe is a subframe including 6 OFDMA symbols. A second type subframe is a subframe including 7 OFDMA symbols. A third type subframe is a subframe including 5 OFDMA symbols. And, a fourth type subframe is a subframe including 9 OFDMA symbols. In this case, the fourth type subframe may be used for a frame structure on 8.75 MHz channel bandwidth.

As shown in Table 1, OFDMA parameters in case of using a CP length of ¼ Tb on 8.75 MHz channel bandwidth may be defined, as the same method for a conventional method for the case of a CP length of ⅛ or 1/16 Tb. In case of with the CP length of ¼ Tb, a symbol duration of OFDM is 128 μs and relative TTG (transmit transition gap) and RTG (receive transition gap) are 61.6 μs and 74.4 μs, respectively. In consideration of the defined OFDMA parameters, in case of using a CP length of ¼ Tb, the number of symbols existing within one frame is 39. A frame structure with a CP length of ¼ Tb using the first to third type subframes according to the number of symbols used to define a subframe in a previous frame structure may be constructed. And, the number of symbols within the frame with the CP length of ¼ Tb is 39.

In case that a frame is constructed with 7 subframes in the same manner of the previous CP length of ⅛ or 1/16 Tb, one OFDMA symbol may be allocated to TTG and RTG interval in a TDD frame structure. And, the remaining 38 OFDMA symbols may be allocated to downlink and uplink. In this case, a TDD frame may include 3 first type subframes and 4 third type subframes.

FIGS. 6 to 10 are diagrams for examples of a TDD frame structure with a CP length of ¼ Tb, which can coexist together with another TDD frame structure with a different CP length, according to a ratio of the number of DL subframes to the number of UL subframes, respectively.

Referring to FIGS. 6 to 10, a ratio of the number of DL subframes to the number of UL subframes may be set to (2:5), (3:4), (4:3), (5:2) or (6:1). If the ratios of the number of DL subframes to the number of UL subframes is set to (2:5), (3:4), (4:3), (5:2) or (6:1), respectively, when a communication is performed using a frame structure with a CP length of ¼ Tb on 8.75 MHz channel bandwidth according to the present invention, interference with a previous frame with a CP length of ⅛ or 1/16 Tb is not generated at a DL/UL switching point. Therefore, frame structures with different CP lengths can coexist mutually.

Since two of 3 first type subframes locate not to be affected by the ratio of the DL subframe number to the UL subframe number, respectively. They are preferably located at a first DL subframe and a last UL subframe in one TDD frame, respectively. Yet, this is just exemplary. The first type subframes are not always located in this manner. A first DL/UL subframe in TDD frame is configured with a first type subframe including 6 symbols so that the first uplink/downlink subframe start with the first type subframe. Besides, the remaining first type subframe may be located within a DL or UL subframe in consideration of the ratio of the DL subframe number to the UL subframe number, the location of the remaining first type subframe is non-limited.

Generally, a last DL subframe located in an interval for the switching to UL from DL includes a subframe constructed with 6 symbols by including an idle interval. However, in order to generate a time difference (or delay) necessary for TTG interval, the last DL subframe may be configured with 5 symbols by having one symbol set to an idle interval. This configuration is always applicable irrespective of the ratio of the DL subframe number to the UL subframe number. In TDD frame, one symbol may be allocated to an idle interval of TTG/RTG.

Figure 8:
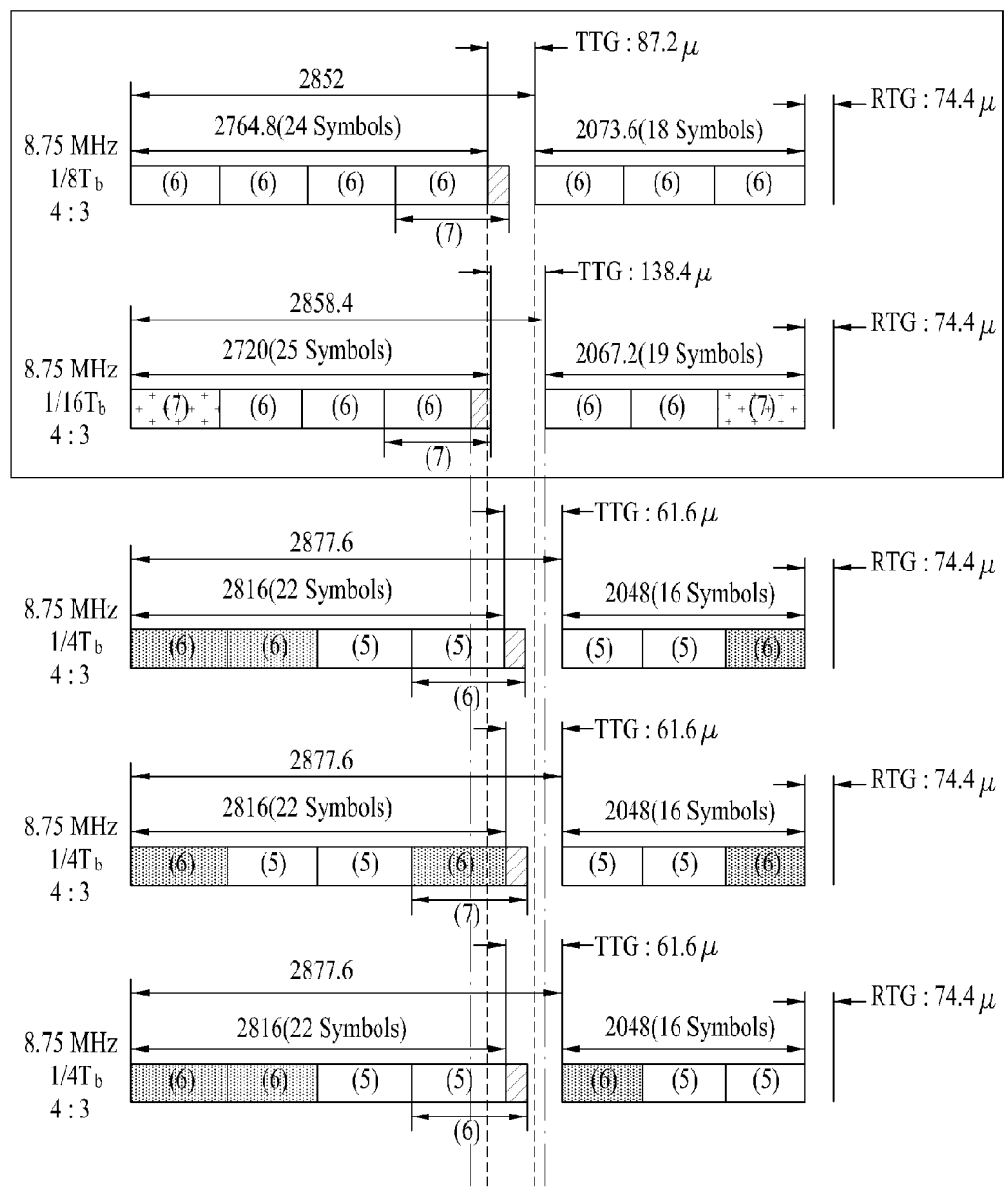
Figure 9:
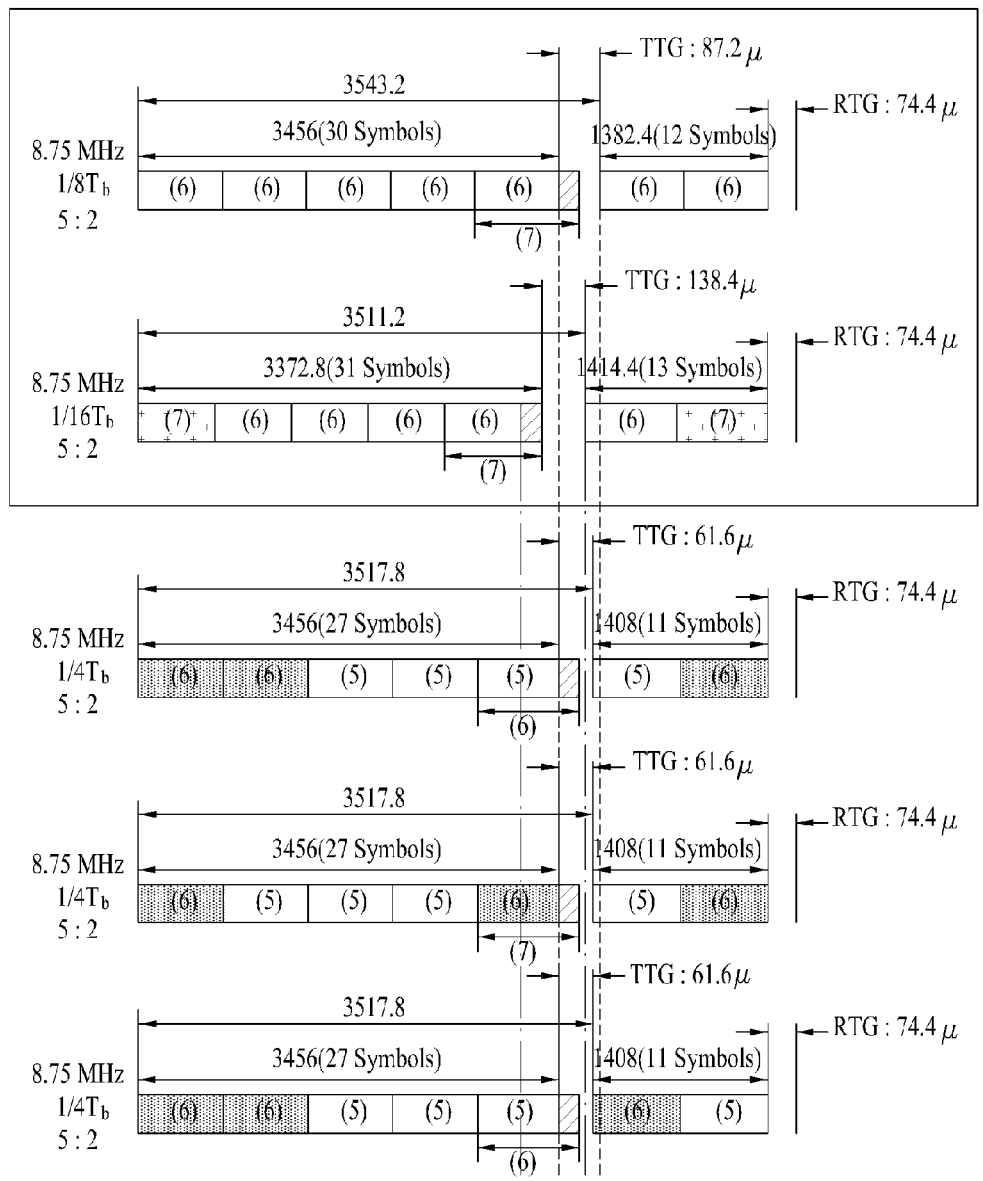
Figure 10:
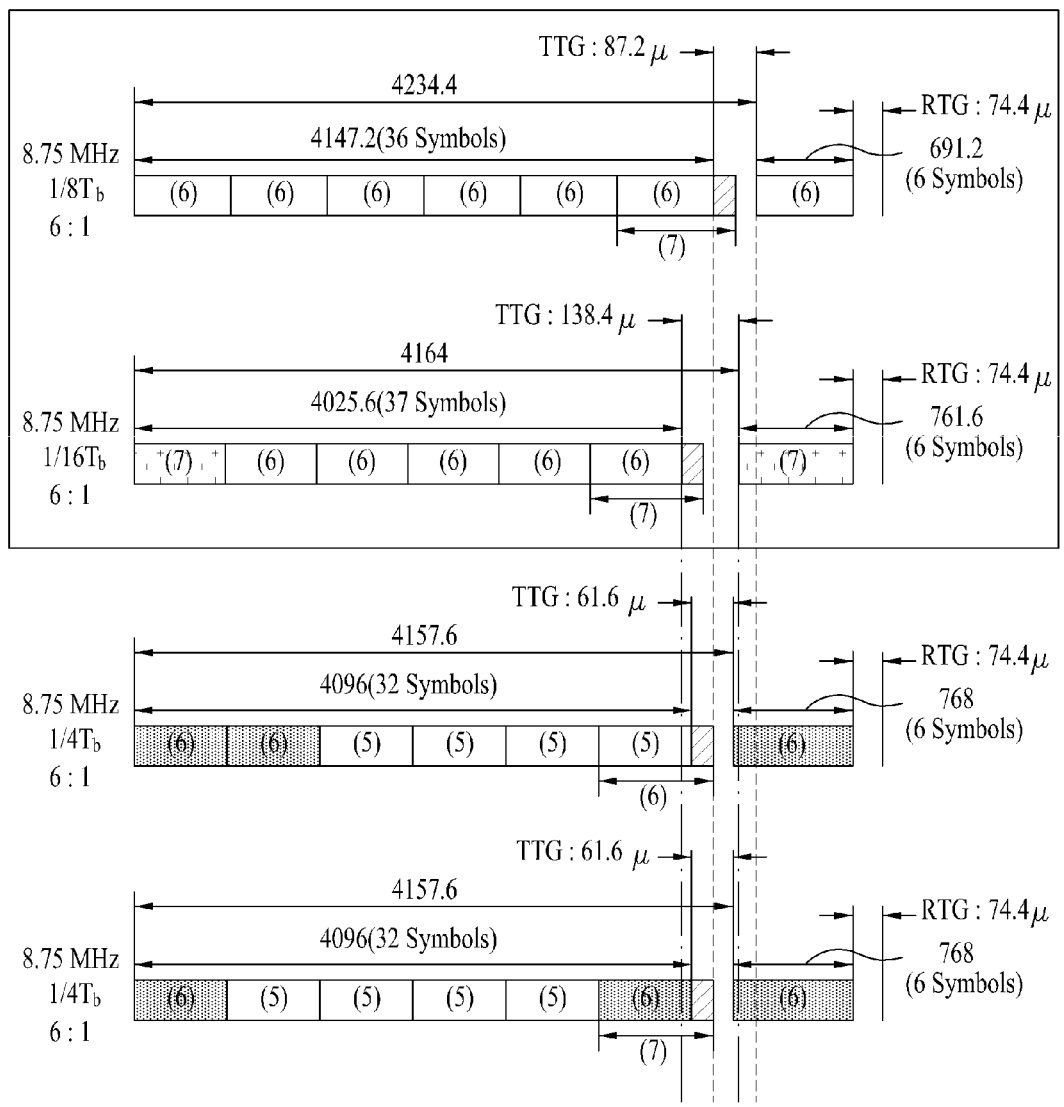

In case that 2 first type subframes are located in a DL region, one of the 2 first type subframes may be located at a first subframe of a DL frame to use a super frame header (SFH) constructed with 6 symbols. If the other first type subframe is located at a last DL subframe, the last DL subframe is a subframe constructed with 7 symbols by including an idle interval or the last DL subframe may be constructed with 6 symbols by allocating one symbol to an idle interval to generate a time difference necessary for TTG interval. This configuration is applicable to a case that a ratio of the number of DL subframes to the number of UL subframes is set to (4:3), (5:2) or (6:1). In this case, for the purpose of coexistence without interference with a previous frame structure with a different CP length, 2 first type subframes may be located in the DL region (interval). This TDD frame structure is shown in FIGS. 8 to 10.

In case that a first type subframe is located at a first subframe of DL subframes, another first type subframe except the above mentioned subframe may be randomly located in the DL region.

In the examples of the above-mentioned frame configurations, if a first type subframe in a DL interval is located at a first DL subframe of TDD frame and a first type subframe in a UL interval is a last UL subframe of the TDD frame, or the first type subframes are located at a first subframe of a DL interval and a first subframe of a UL interval, respectively, it is able to solve the above-mentioned interference problem that may be generated from a switching interval from DL to UL.

If the first type subframes are located at the first DL subframe and the last UL subframe of the TDD frame or the first type subframes is located at the first DL subframe and the first UL subframe, as shown in FIGS. 6 to 10, it is just one example for coexistence with a previous frame structure with a different CP length. In particular, a subframe configured with 6 symbols may be located at a random subframe in each DL or UL region. Moreover, even if a first type subframe and a second type subframe are located at a first DL frame and a second DL frame in a previous frame structure with a CP length of 1/16 Tb, respectively, as shown in one of FIGS. 6 to 10, the TDD frame structure of the present invention proposed in FIGS. 6 to 10 can mutually coexist with a previous frame structure with a CP length of 1/8 or 1/16 Tb.

Figure 11:
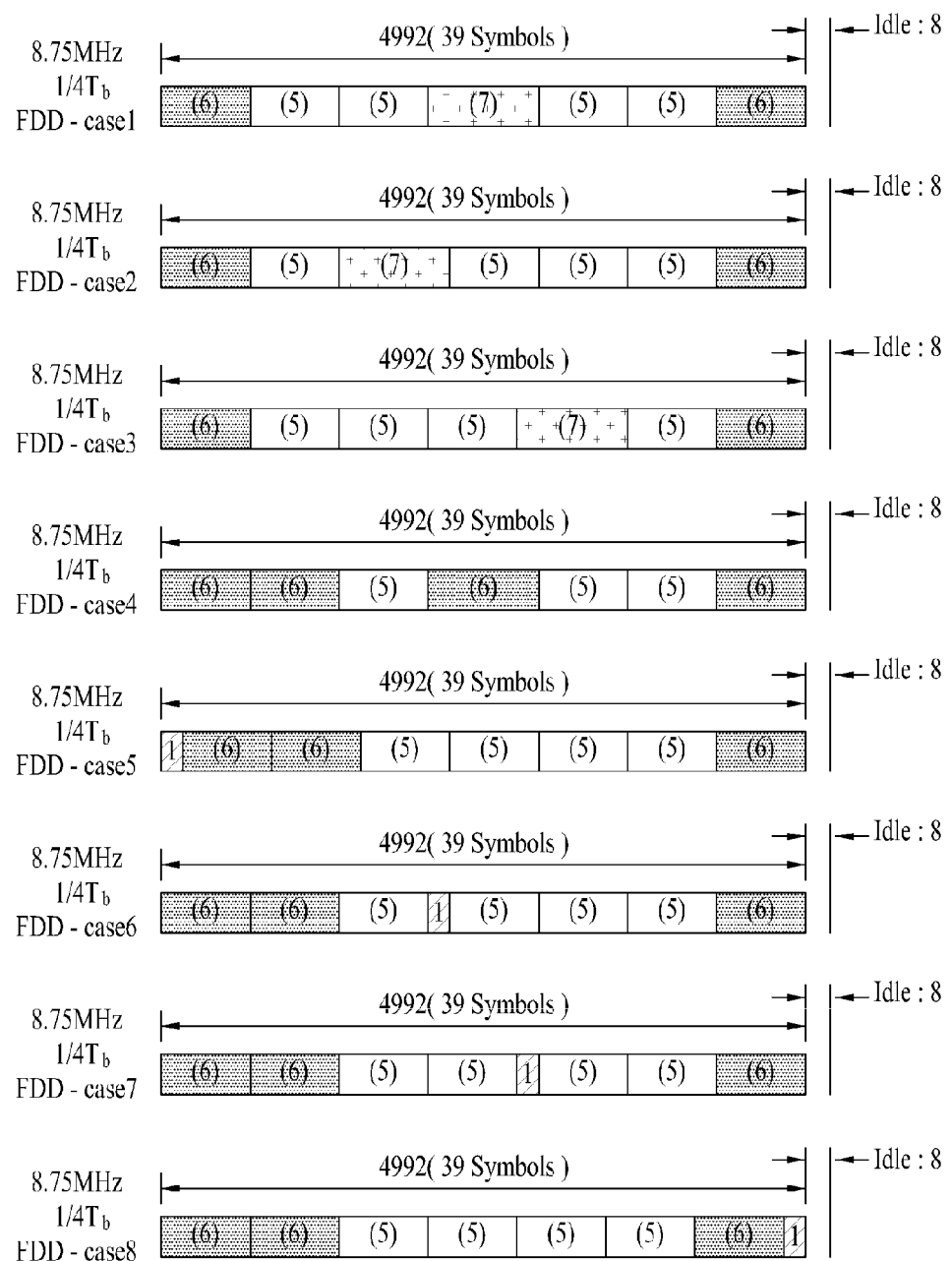
FIG. 11 is a diagram for an example of an FDD frame structure with a CP length of 1/4 Tb.

FIG. 11 is a diagram for an example of an FDD frame structure with a CP length of 1/4 Tb.

FDD frame structure shown in FIG. 11 is a frame structure corresponding to the TDD frame structure shown in one of FIGS. 6 to 10 and is able to have commonality with the TDD frame structure. If this frame structure is designed to have commonality with a TDD frame structure, it is advantageous in reusing the design of channel for essential control information or additional control information in physical layer design taken into consideration in designing a system. Therefore, an FDD frame structure is preferably configured by succeeding to a TDD frame structure. And, 39 symbols may be allocated to an FDD frame.

A basic structure of the FDD frame may include 7 subframes in the same manner of the TDD frame structures shown in FIGS. 6 to 10. And, 39 symbols may be allocated to this structure. First type subframes are located to first and last subframes of the FDD frame to maintain commonality. If first type subframes are located at first subframes of DL and UL regions in the TDD frame structure, respectively, it is able to maintain the commonality in allocating 6 symbols thereto in the same manner of a previous structure. In this case, the first type subframe arranged in each region additionally may be located at a random subframe in the corresponding region without limitation put on its location. In particular, if a first type subframe is located at a second subframe in FIG. 11, it is just one example for an FDD frame structure. Thus, limitation is not put on the location of the first type subframe in the DL/UL region.

Since the FDD frame structure does not need TTG/RTG of the TDD frame structure, it is able to further utilize one symbol. Therefore, it is able to consider that a second type subframe is configured by adding one remaining symbol to a first, a first type subframe is configured by adding the one remaining symbol to third type subframe. A location of a subframe, to which one symbol can be additionally allocated, may include $3^{rd}$, $4^{th}$, or $5^{th}$ subframe in FDD frame in Case 1/2/3/4 shown in FIG. 11. This considers H-FDD frame structure. In case of considering the H-FDD frame structure, an additional idle interval is required between groups. For this, it is able to configure such an additional interval using a first or second type subframe. Yet, this is a considered location for example. Limitation is not put on a location of the first or second type subframe to which one symbol is added.

Alternatively, there is a method of allocating one remaining symbol individually. Referring to Case 5 shown in FIG. 11, one additional symbol may be allocated to a first subframe in an FDD frame. Since symbol-unit essential control informations such as a preamble or a frame control header (FCH) are carried on a head part of a frame, a first type subframe may be used for data transmission using one symbol after the control information has been transmitted. Alternatively, referring to Case 8 shown in FIG. 11, one symbol is allocated to a last subframe of the FDD frame and is used to transmit additional information like sounding.

Moreover, in case of considering H-FDD frame structure, one symbol may be preferably located in front or rear of a $4^{th}$ subframe. This is one example for a preferable location only. And, a location of one added symbol is non-limited by the present invention.

As mentioned in the foregoing description, in case that one frame is configured with 7 subframes, 2 first type subframes may be located at $1^{st}$ and last subframes in the corresponding frame. And, it is able to consider that one remaining first type subframe is located at a $2^{nd}$ subframe or a random subframe in a DL interval.

FIGS. 12 to 16 are diagrams for examples of a TDD frame structure with a CP length of 1/4 Tb, which can coexist together with a frame structure with a different CP length, according to a ratio of the number of DL subframes to the number of UL subframes.

Figure 12:
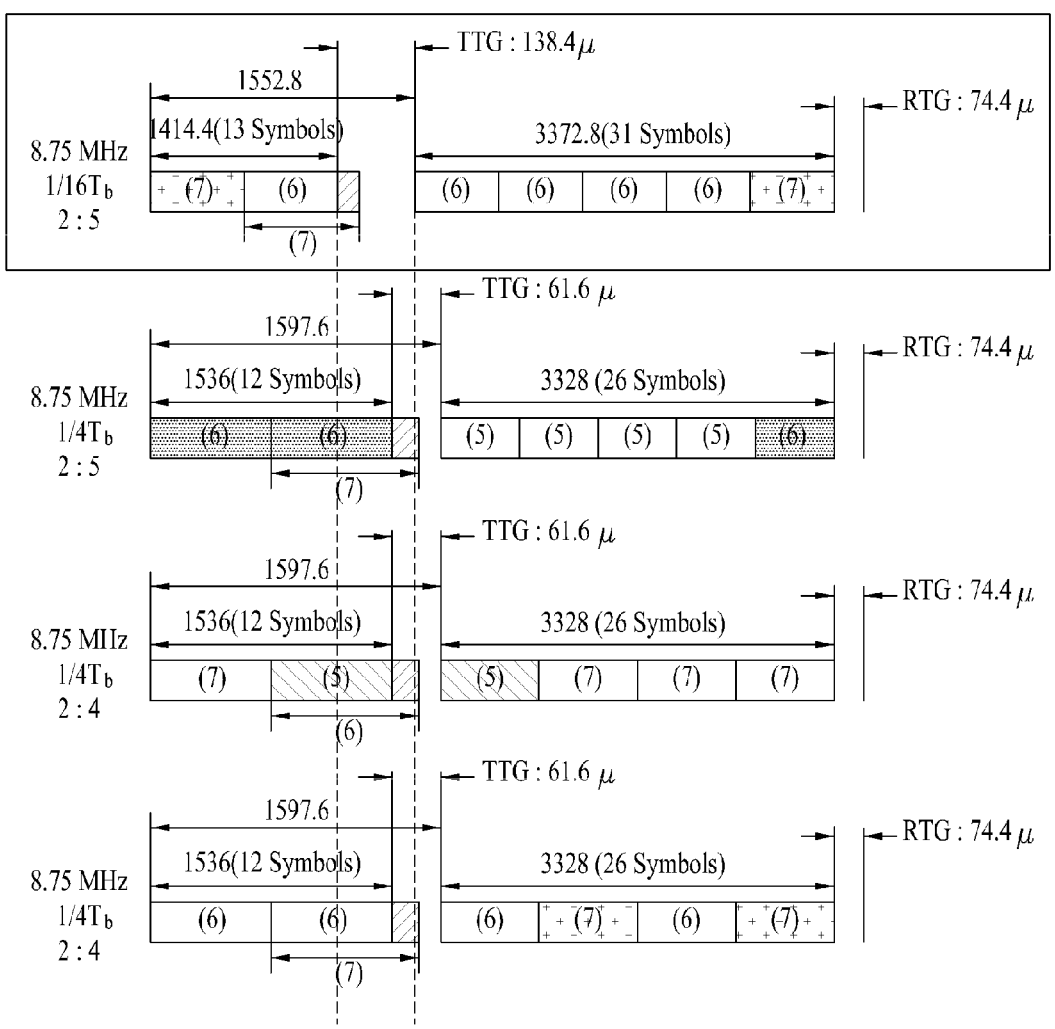
FIGS. 12 to 16 are diagrams for examples of a TDD frame structure with a CP length of 1/4 Tb, which can coexist together with a frame structure with a different CP length, according to a ratio of the number of the DL subframes to the number of UL subframes.
Figure 13:
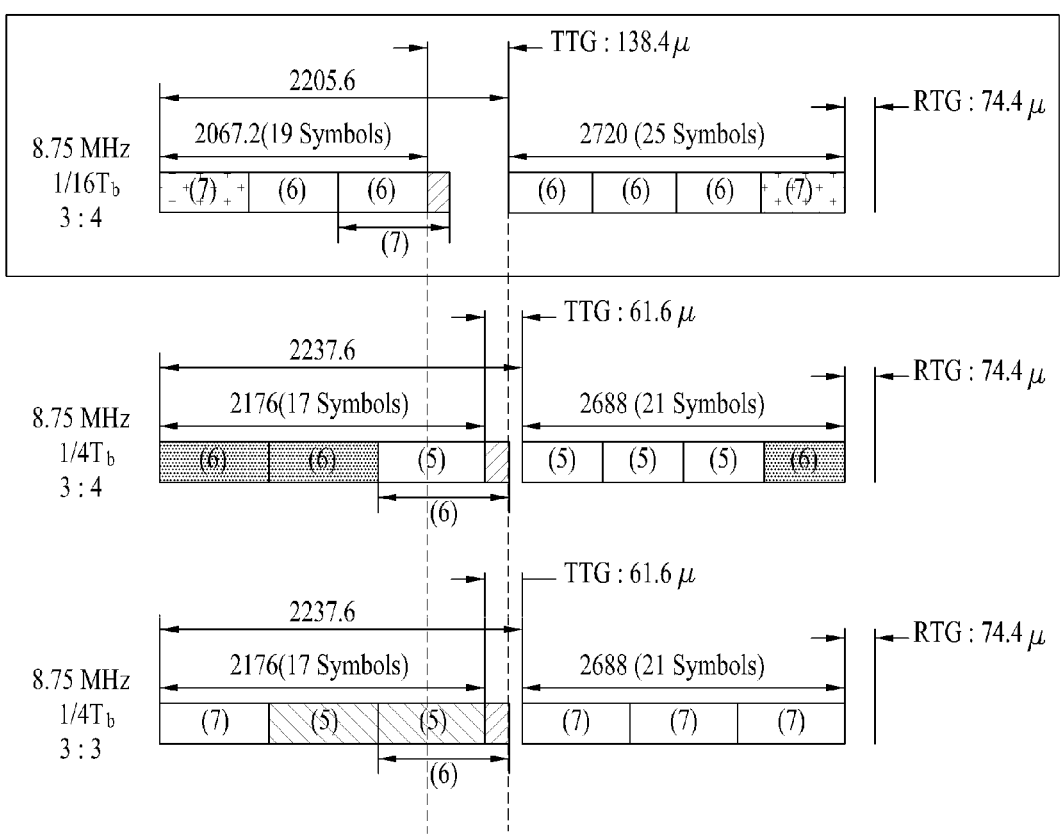
Figure 14:
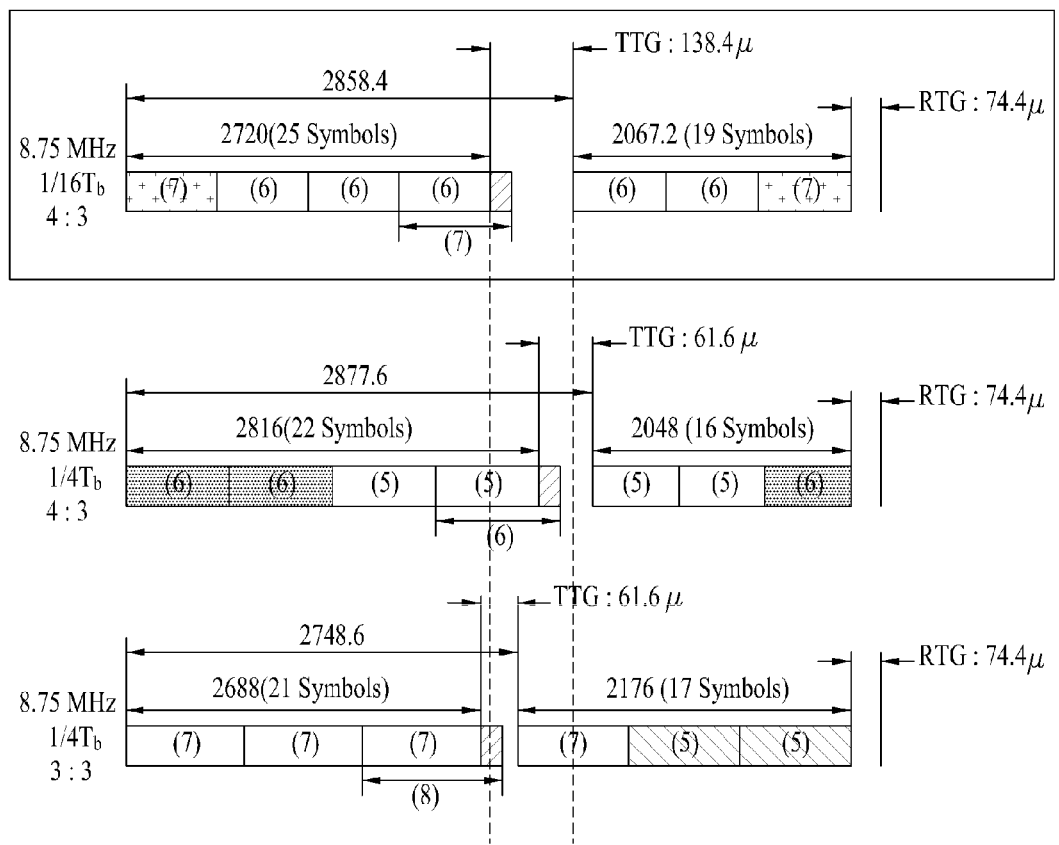
Figure 15:
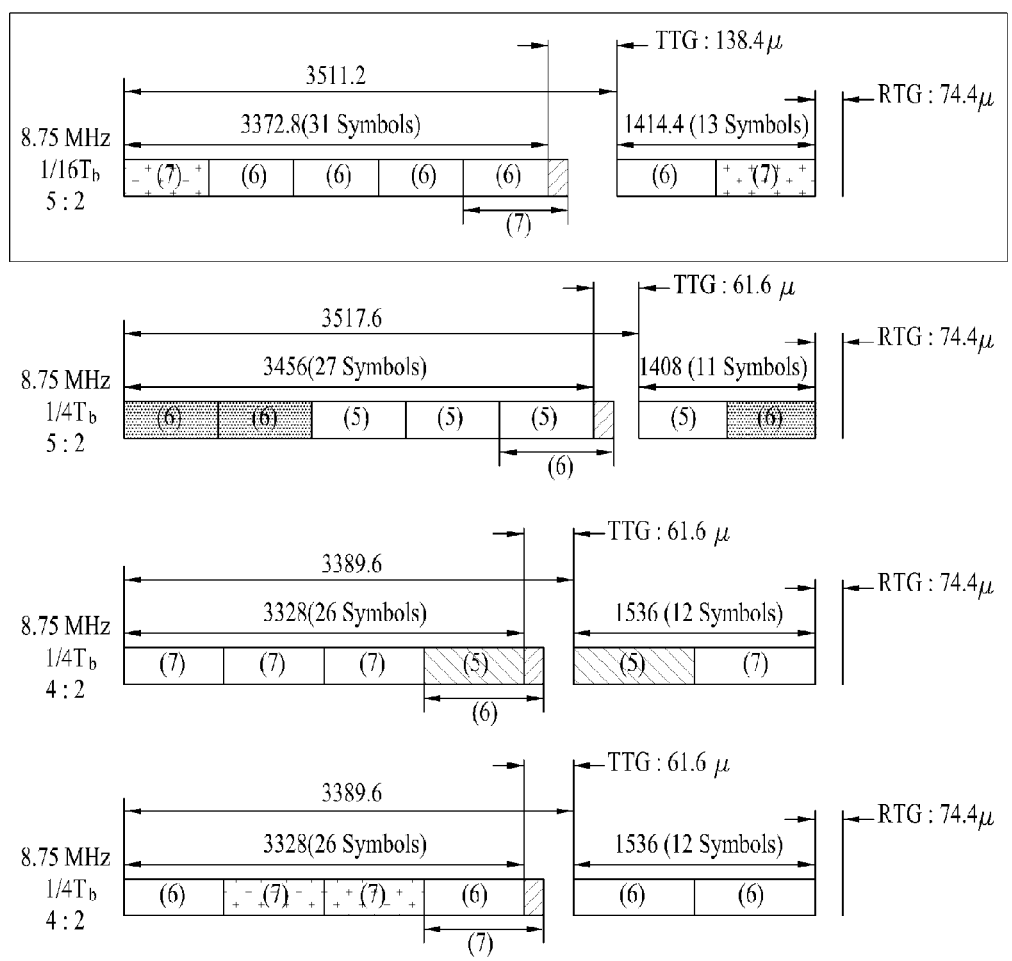
Figure 16:
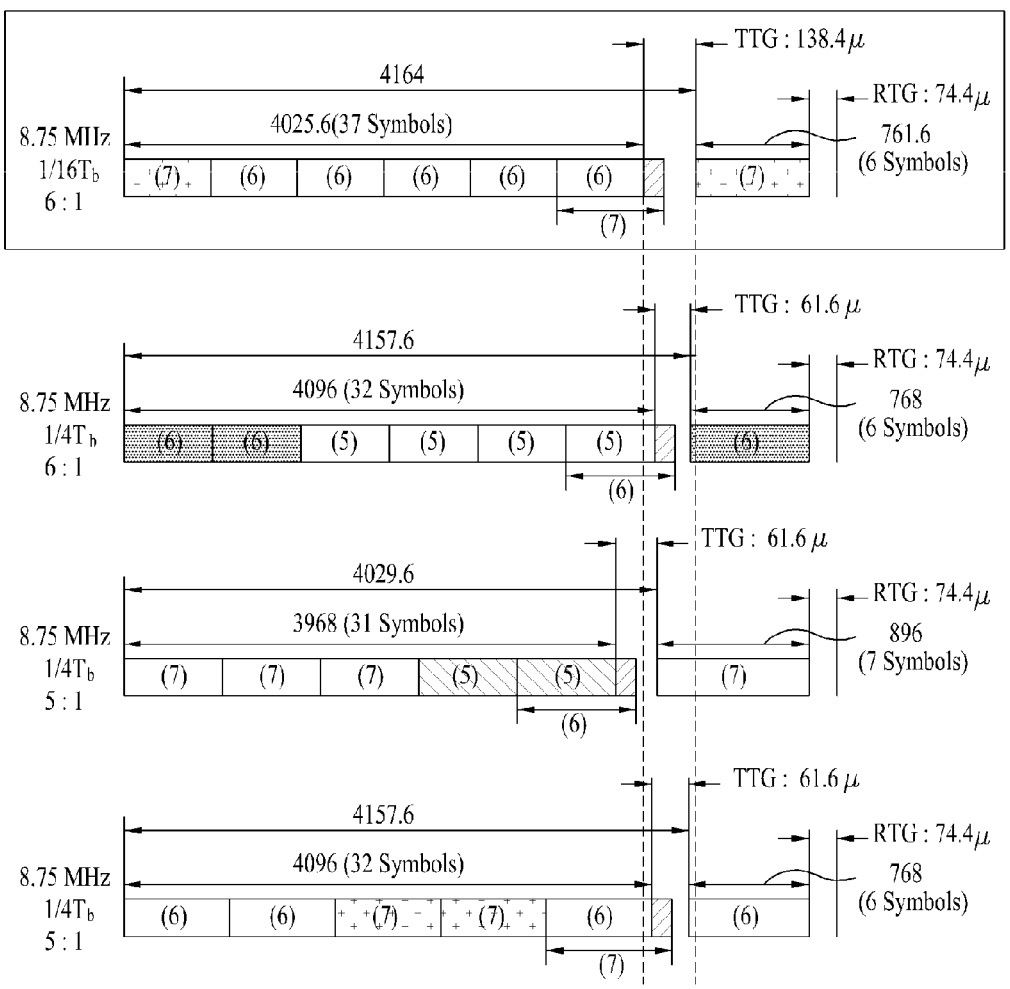

Referring to FIGS. 12 to 16, a ratio of the number of DL subframes to the number of UL subframes may be set to one of (2:5), (2:4), (3:4), (3:3), (4:3), (5:2), (4:2), (6:1) and (5:1). If the ratio of the number of DL subframes to the number of UL subframes in FIG. 12 is (2:5) or (2:4), a ratio of the total number of symbols allocated to DL subframes to the total number of symbols allocated to UL subframes is (12:26). If the ratio of the number of DL subframes to the number of UL subframes in FIG. 13 is (3:4) or (3:3), a ratio of the total number of symbols allocated to DL subframes to the total number of symbols allocated to UL subframes is (17:21). If the ratio of the DL subframe number to the UL subframe number in FIG. 14 is (4:3) or (3:3), a ratio of the total number of corresponding symbols allocated to DL subframes to the total number of corresponding symbols allocated to UL subframes is (22:16) or (21:17). If the ratio of the DL subframe number to the UL subframe number in FIG. 15 is (5:2) or (4:2), a ratio of the total number of corresponding symbols allocated to DL subframes to the total number of corresponding symbols allocated to UL subframes is (27:11) or (26:12). If the ratio of the DL subframe number to the UL subframe number in FIG. 16 is (6:1), a ratio of the total number of symbols allocated to DL subframes to the total number of symbols allocated to UL subframes is (32:6). If the ratio of the DL subframe number to the UL subframe number in FIG. 16 is (5:1), a ratio of the total number of symbols allocated to DL subframes to the total number of symbols allocated to UL subframes is (31:7) or (32:6).

In order to coexist without interference with a frame structure with a previously defined CP length of 1/16 Tb, it is necessary for DL/UL switching points not to be overlapped with each other. For this, it is able to consider that a frame structure with a CP length of 1/4 Tb is configured with 6 subframes. In TDD frame, one symbol may be allocated for TTG/RTG interval. And, it is able to configure a TDD frame constructed with 6 subframes using 38 remaining symbols like the two following cases.

In the first case, a TDD frame may be constructed with 4 second type subframes and 2 third type subframes. In the second case, a TDD frame may be constructed with 4 first type subframes and 2 second type subframes.

In consideration of an idle interval, a first or second type subframe may be located at a last DL frame that is a switching interval from DL to UL in a TDD frame structure. If the second type subframe is located at the last DL subframe, a new type subframe constructed with 8 symbols by including the idle interval is generated. This deviates from a scope of a previously defined subframe. Therefore, the new type subframe needs to be defined.

In case that the second type subframe is allocated to the last DL subframe located in the interval for switching to UL from DL in consideration of the idle interval, one symbol may be set to the idle interval for a delay necessary for a TTG interval.

Hence, the first type subframe constructed with 6 symbols may be located at the last DL subframe. In this case, first type subframes may be located at first and last subframes of a frame in a DL region. This configuration is applicable irrespective of a ratio of the number of DL subframes to the number of UL subframes.

In order to coexist without interference with a previously defined frame structure with a CP length of $\frac{1}{16}$ Tb, if one frame is configured using 6 subframes like the first case, a third type subframe may be located at a last DL subframe in consideration of a switching interval from DL to UL irrespective of the ratio of the DL subframe number to the UL subframe number. Moreover, referring to FIG. 14, if the ratio of the DL subframe number to the UL subframe number is (3:3), a new type subframe constructed with 8 symbols may be located at a last DL subframe.

In the second case for constructing a frame with first and second type subframes, if the first type subframes are located at first subframes in DD and UL regions, respectively, the first or second type subframe may be located at a last DL subframe that is a switching interval from DL to UL. In this case, in consideration of 1 symbol allocated for an idle time of the switching interval, a subframe constructed with 7 or 8 symbols may be located at a last DL subframe. In this case, in order to coexist without interference with a previously defined frame structure with a CP length of $\frac{1}{16}$ Tb, 2 second type subframes constructing a TDD frame may be located in the DL and UL regions, respectively. Corresponding examples are shown in FIG. 12, FIG. 15 and FIG. 16. In this case, the locations of the first and second type subframes are just exemplary. And, the locations of the subframes of the above types are non-limited in the DL and UL regions.

FIGS. 12 to 16 show a frame structure to coexist without interference with a previously defined frame structure with a CP length of $\frac{1}{16}$ Tb using 7 subframes. In FIGS. 12 to 16, if one frame is constructed with 6 subframes, second type subframes are arranged at first and last subframes in a frame or DL and UL intervals, respectively. This is just exemplary only. A subframe constructed with 7 symbols may be located at a random subframe in each DL/UL region.

Figure 17:
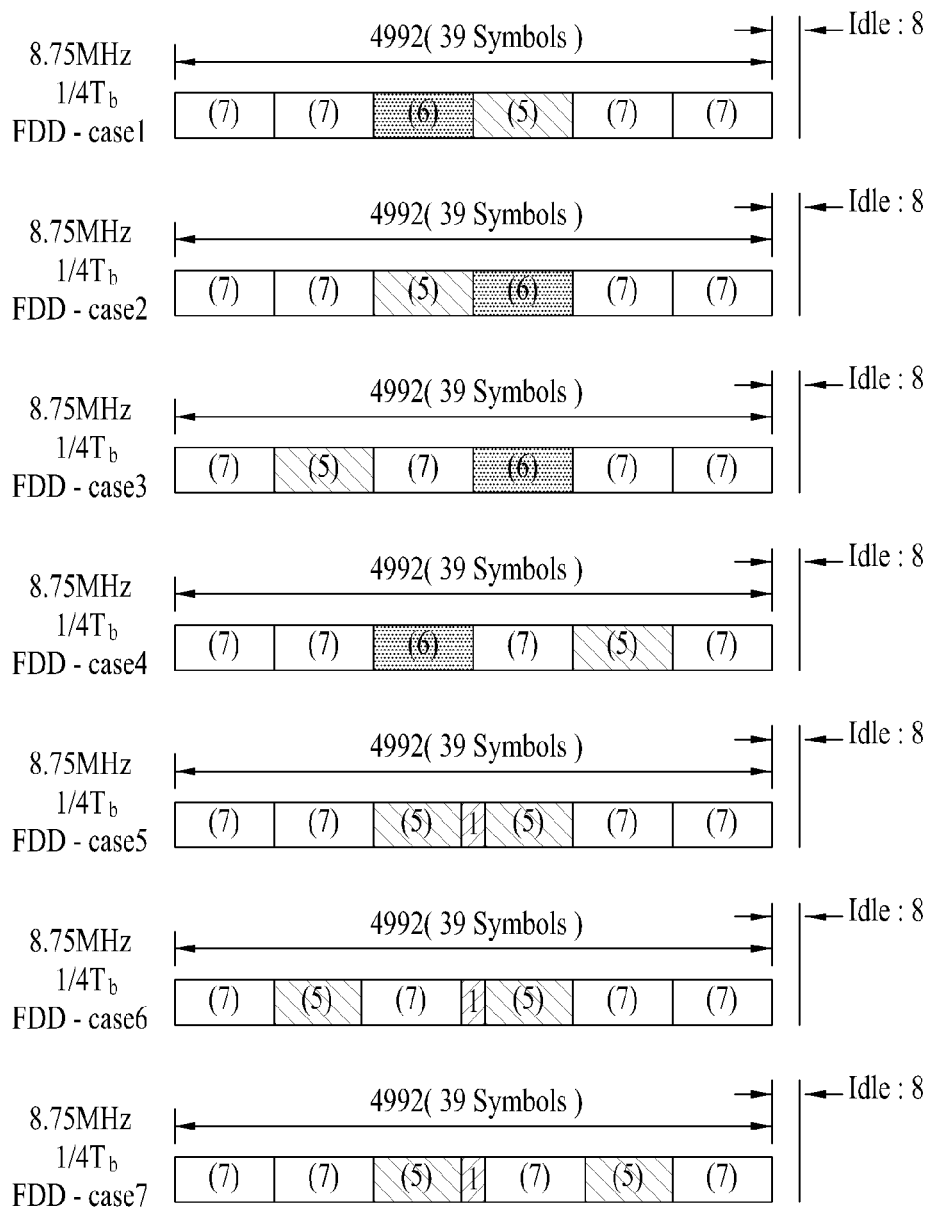
FIG. 17 is a diagram for an example of an FDD frame structure with a CP length of 1/4 Tb.

FIG. 17 is a diagram for an example of an FDD frame structure with a CP length of $\frac{1}{4}$ Tb.

First of all, an FDD frame structure shown in FIG. 17 is a frame structure corresponding to the TDD frame structure shown in FIGS. 12 to 16. A frame structure for FDD is preferably configured by succeeding to a TDD structure. By applying the above-described FDD frame structure per Case, it is able to appropriately configure an FDD frame. Therefore, like the TDD frame structures shown in FIGS. 12 to 16, one frame consists of 7 subframes in this frame structure. And, an FDD structure for a case that a first type subframe is located at a second subframe of a frame can consider a frame structure like one of FDD-Cases 4 to 9 shown in FIG. 11.

In case that an FDD frame is constructed with 6 subframes, one frame consists of 6 subframes like a previous TDD frame structure, as shown in FIGS. 12 to 16. And, second type subframes are located at first and last subframes and second and fifth subframes of the frame, respectively to maintain a symmetric structure.

Meanwhile, 39 symbols may be allocated to the FDD frame shown in FIG. 17. Since TTG/RTG is not required for the FDD frame structure unlike the TDD frame structure, one symbol may be used in addition. Therefore, it is able to consider configuring a first type subframe in a manner of adding a remaining symbol to a third type subframe. The subframe including added one symbol thereto may be located at $3^{rd}$ or $4^{th}$ subframe in the frame of Cases 1 to 4 shown in FIG. 17.

Yet, this considers H-FDD frame structure. In case of considering H-FDD structure, an inter-group idle interval is additionally necessary. For this, the additional inter-group idle interval is configured using a first or second type subframe. Moreover, a location of the first or second type subframe having one symbol added thereto is non-limited by the present invention.

As another method of allocating one additional symbol, there is an individual allocation method. A location of this symbol is shown in Cases 1 to 4 of FIG. 17 described in consideration of H-FDD. In this case, this symbol is preferably located between $3^{rd}$ and $4^{th}$ subframes. This location is a preferable location only. The location of the added symbol is non-limited by the present invention. Therefore, as mentioned in the foregoing description of the FDD frame structure, one symbol may be allocated to a first or last subframe in a frame individually.

Figure 18:
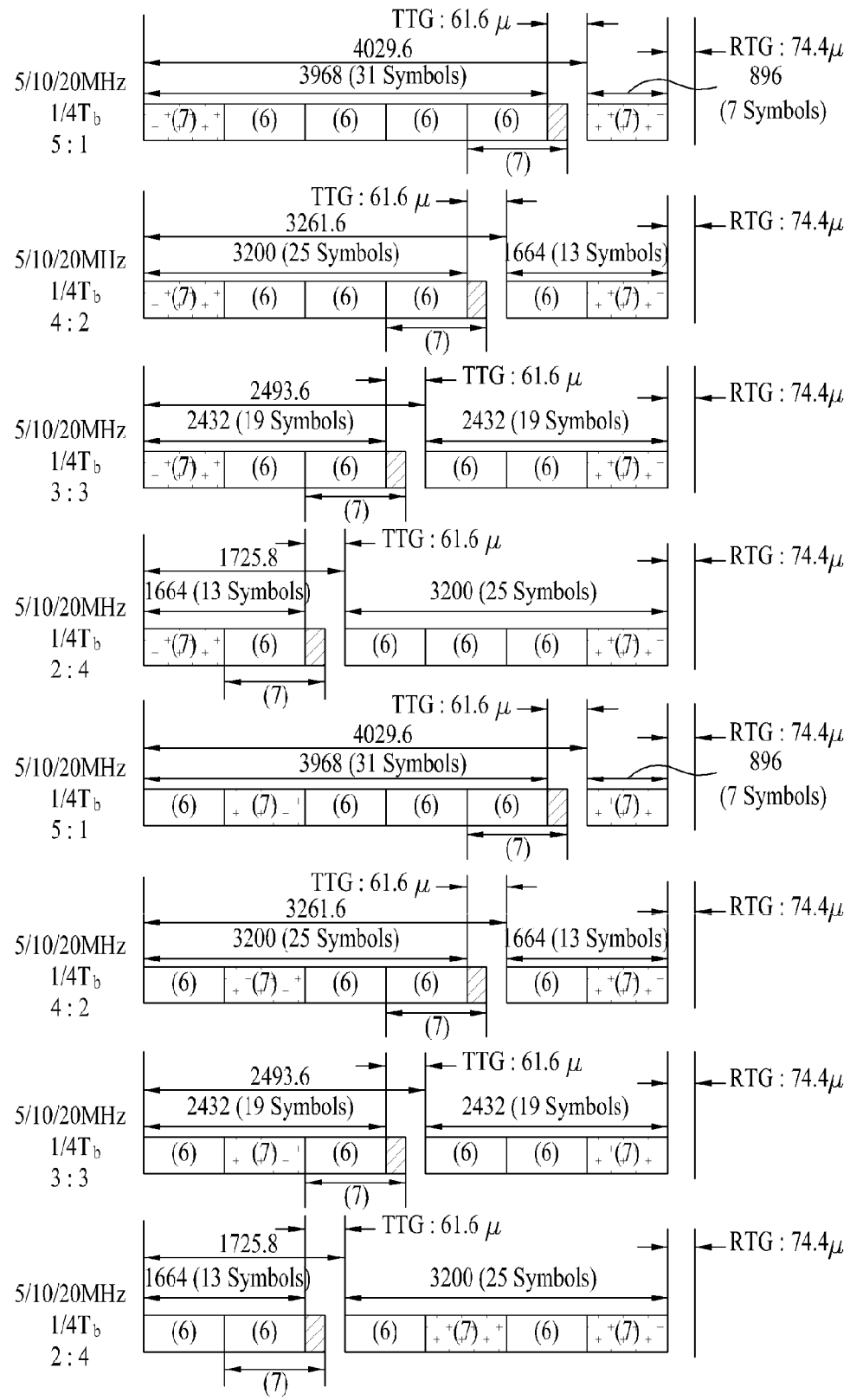
FIG. 18 is a diagram for an example of a TDD frame structure with a CP length of 1/4 Tb.

FIG. 18 is a diagram for an example of a TDD frame structure with a CP length of $\frac{1}{4}$ Tb.

Referring to FIG. 18, in case that one TDD frame consists of 6 subframes, it is able to construct a frame by allocating first type subframes, each of which includes 6 symbols, more. In this case, one TDD frame may consist of 4 first type subframes and 2 second type subframes. Since it is preferable that the 2 second type subframes are located at positions not to be affected by a ratio of the number of DL subframes to the number of UL subframes, the 2 second type subframes may be located at a first DL subframe and a last UL subframe in one frame, respectively. Thus, the second type subframes are located at the first DL subframe and the last UL subframe, respectively. This is just exemplary and the location of the second type subframe is non-limited.

When the number of DL subframes is at least 2, in case of considering a ratio of the number of DL subframes to the number of UL subframes, the second type subframe may be located at a $2^{nd}$ subframe in a frame. As mentioned in the foregoing description, it is able to configure a frame in a manner of arranging first type subframes at $1^{st}$ subframes in DL and UL regions, respectively. Thus, as the first type subframe having 6 symbols is located at the $1^{st}$ subframe in the frame, it is able to successively use the previous super frame header structure defined as 6 symbols without amending a subframe structure.

Although the last DL subframe located at the switching interval from DL to UL is the subframe constructed with 7 symbols by including the idle interval, it is generally able to construct a subframe with 6 symbols by allocating one symbol to an idle interval to generate a time difference necessary for TTG interval. This configuration is applicable irrespective of the ratio of the DL subframe number to the UL subframe number.

In FIG. 18, shown are a frame structure, in which second type subframes are located at first and last subframes in a frame, respectively and a frame structure, in which first type subframes are located at first subframes of DL and UL regions, respectively. The frame structure shown in FIG. 18 is just exemplary. And, locations of the first and second type subframes for configuring one frame are non-limited.

Figure 19:
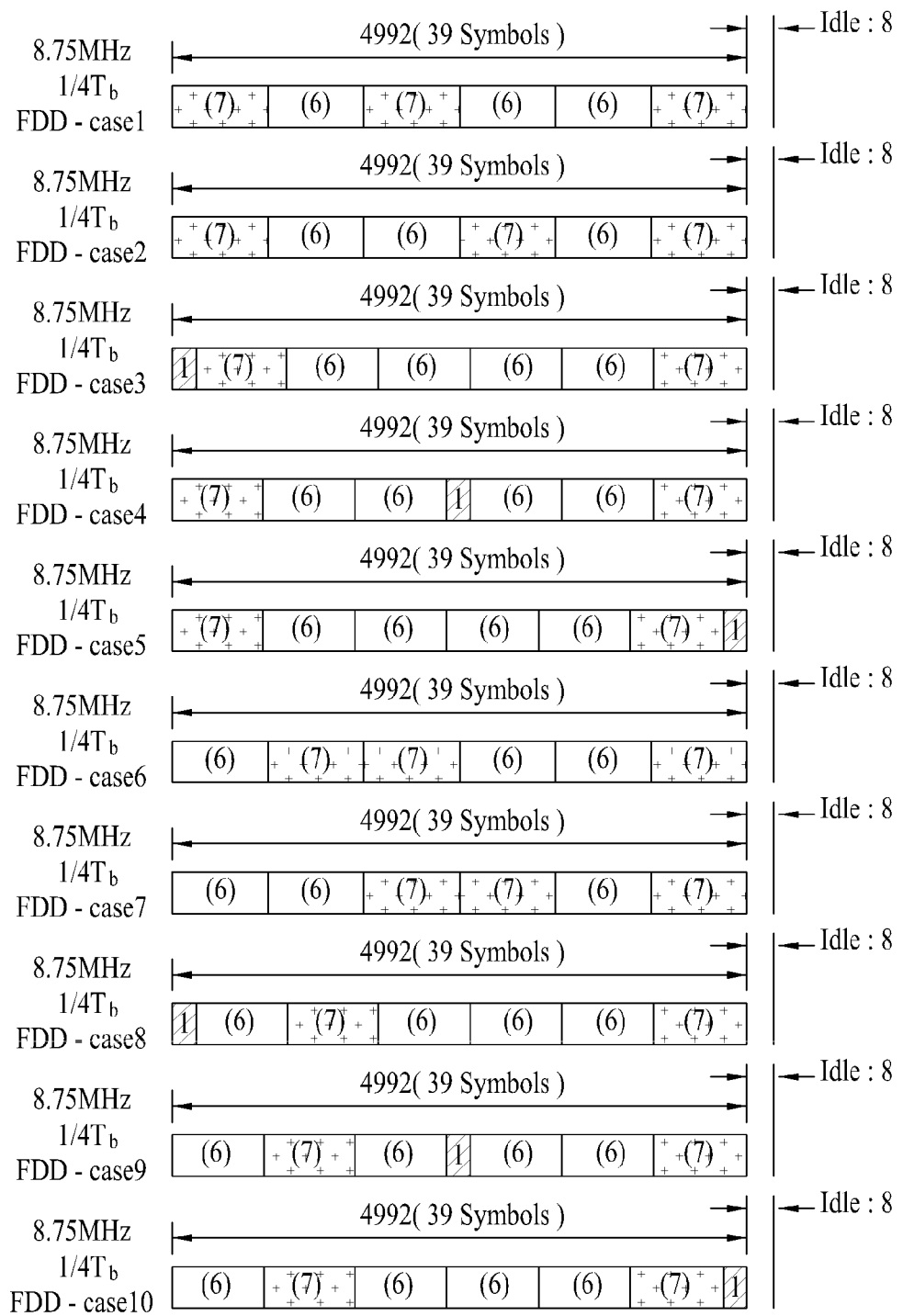
FIG. 19 is a diagram for an example of an FDD frame structure with a CP length of 1/4 Tb.

FIG. 19 is a diagram for an example of an FDD frame structure with a CP length of $\frac{1}{4}$ Tb.

First of all, an FDD frame structure shown in FIG. 19 corresponds to a frame structure corresponding to the TDD frame structure shown in FIG. 18. Preferably, the FDD frame structure is configured by succeeding to the TDD frame structure. By applying the FDD frame structure per Case proposed in the foregoing description, a proper FDD frame structure can be taken into consideration. A second type subframe, as shown in FIG. 18, may be located at a first, second or last subframe in a frame. And, first type subframes may be arranged at first subframes of DL and UL regions, respectively.

In this case, as the FDD frame structure does not need a TTG/RTG interval unlike the TDD frame structure, one symbol may be additionally utilized. Therefore, it is able to consider configuring a second type subframe by adding a remaining symbol to a first type subframe. The subframe having the added symbol located thereat can be located at a $3^{rd}$ or $4^{th}$ subframe in a frame, as shown in Case 1 or Case 2 of FIG. 19. This considers H-FDD frame structure. In case of considering H-FDD frame structure, an additional idle interval between groups is necessary. For this, it is able to additionally configure a necessary interval using a second type subframe. Yet, this is just am example of considered location. And, a location of a second type subframe, to which one symbols is added, is non-limited by the present invention.

As another method of allocating one additional symbol, there is a method of arranging one remaining symbol individually. If a symbol is added in front of a $1^{st}$ subframe in a frame, as shown in Case 3 of FIG. 19, it is to transmit such control information carried on a head part of a frame as essential control informations of symbol unit such as a preamble or a frame control header (SFH).

Besides, unlike the above description, it is able to use one symbol to carry such additional information as sounding in a manner of allocating a symbol in rear of a last subframe in a frame, as shown in Case 5. Preferably, in consideration of the H-FDD frame structure, one symbol is located between a $3^{rd}$ subframe and a $4^{th}$ subframe. This is an example of a preferred location only. And, a location of an added symbol is non-limited by the present invention.

Moreover, as mentioned in the foregoing description, a second type subframe located at a $1^{st}$ subframe in a frame may be located at a $2^{nd}$ subframe in the frame. And, a first type subframe may be located at the $1^{st}$ subframe in the frame. In this case, the second type subframe located at the $1^{st}$ subframe in the frame can be represented as a structure that the second type subframe is located at a $2^{nd}$ subframe in an FDD frame structure, as shown in FIG. 19. In a manner that a first type subframe including 6 symbols is located at a $1^{st}$ subframe in a frame, it is able to use a previously defined super frame header structure constructed with 6 symbols without modification.

Thus, a signal is transmitted/received using a TDD frame structure for 8.75 MHz channel bandwidth with a CP length of ¼ Tb according to the present invention and an FDD structure having commonality with the TDD frame structure. Therefore, mutual coexistence with a previously defined frame with a different CP length is possible.

In the following description, TDD frame structure for 8.75 MHz channel bandwidth with a CP length of ¼ Tb in IEEE 802.16m system and an FDD frame structure having commonality with the TDD frame structure are explained.

A TDD frame structure for 8.75 MHz channel bandwidth with a CP length of ¼ Tb according to the present invention and an FDD frame structure have commonality with a previously defined frame with a different CP length. In order to coexist together with the previously defined frame with a different CP length, this frame structure does not cause interference in a manner that switching points from DL to UL are not overlapped with each other in TDD frame. In case of using a CP length of ¼ Tb on 8.75 MHz, as shown in Table 1, OFDMA parameters can be defined by the method for a previous case of CP length of ⅛ Tb or 1/16 Tb. If a CP length is set to ¼ Tb, a symbol duration of OFDM is 128 μs and the number of OFDMA symbols existing in one frame is 39.

It is able to construct a frame structure with a CP length of ¼ Tb using first to third type subframes according to the number of symbols used to define a subframe in a previous frame structure. In a TDD frame structure, one symbol may be allocated as a TTG/RTG interval. In case that DL and UL regions are allocated with 38 remaining symbols, relative TTG and RTG are set to 61.6 μs and 74.4 μs, respectively. This is a value smaller than that of TTG/RTG in a previous frame structure with a CP length of ⅛ or 1/16 Tb shown in Table 1. Therefore, if a switching to UL from DL is performed, a problem may be caused.

Yet, according to the present invention, in order to generate an interval similar to TTG/RTG of a previously defined frame with a different CP length in a frame, it is able to construct a frame with 37 symbols remaining after 2 symbols have been allocated as TTG and RTG intervals in a TDD frame structure.

Figure 20:
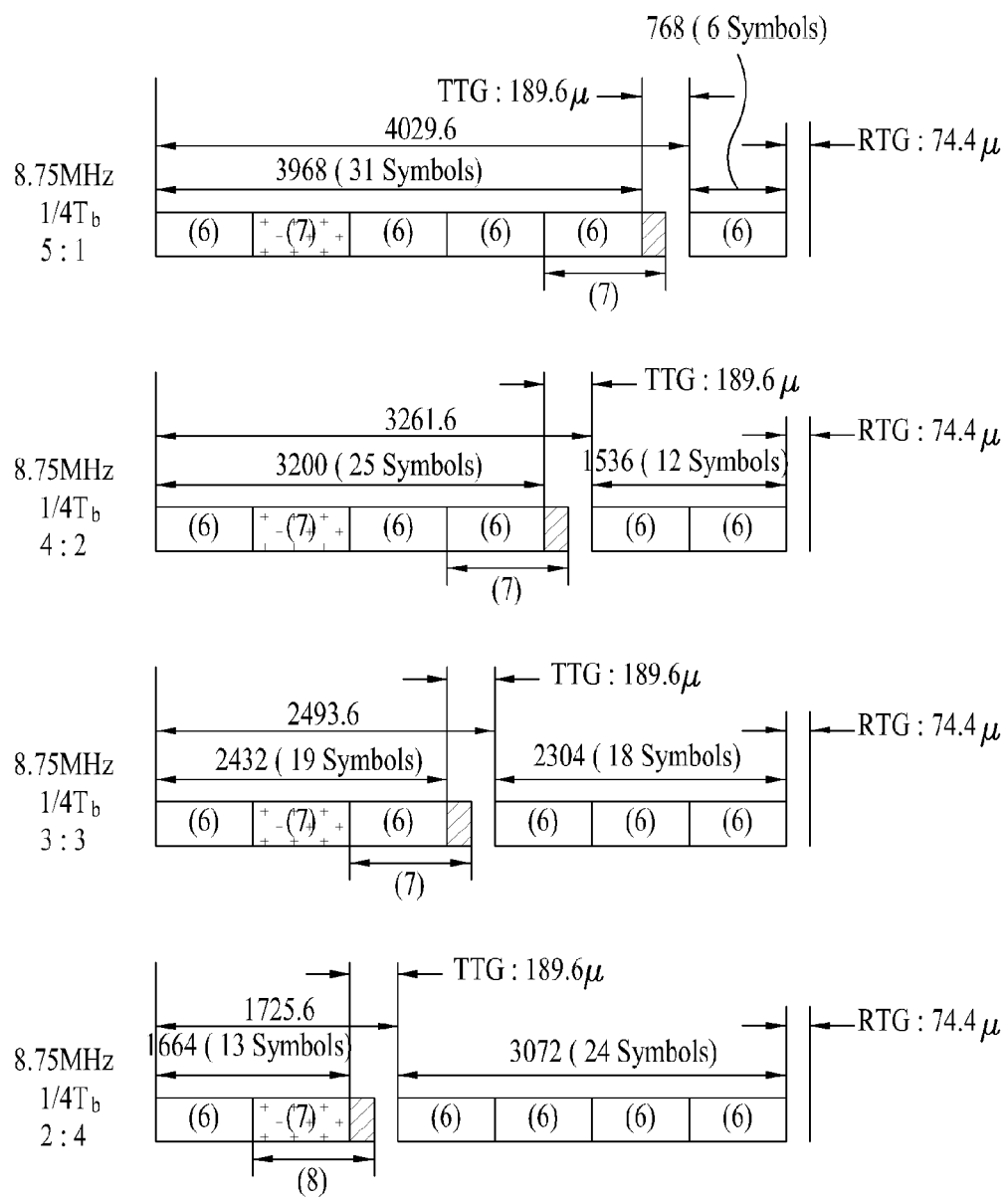
FIG. 20 is a diagram for an example of a TDD frame structure with a CP length of 1/4 Tb.

FIG. 20 is a diagram for an example of a TDD frame structure with a CP length of ¼ Tb.

Referring to FIG. 20, a TDD frame may be constructed with 6 subframes in order to use a first type subframe of a previous subframe type, which includes 6, symbols, as many as possible. And, one frame consists of 5 first type subframes and one second type subframe. In particular, when a frame is constructed by allocating 38 symbols, a second type subframe may be changed into a first type subframe by allocating one symbol to one of the 2 second type subframes for TTG/RTG. As a corresponding result, it is able to configure a frame structure, of which number of second type subframes is decremented by 1 smaller than that of a previous case of allocating one symbol. In particular, in a TDD frame structure, one symbol may be allocated as an idle interval for TTG/RTG.

In FIG. 20, if a ratio of the number of DL subframes to the number of UL subframes is (5:1), (4:2), (3:3), or (2:4), a ratio of the total number of symbols allocated to corresponding DL subframes to the total number of symbols allocated to UL subframes can become (31:6), (25:12), (19:18), or (13:24), respectively.

One second type subframe existing in a TDD frame may be located in DL or UL region. In this case, since a previously defined first type subframe is preferably located at a first subframe of a frame to transmit a preamble and a super frame header (SFH) in case of DL, second type subframes are preferably located in a manner of starting with a second subframe in the frame. Therefore, as the first type subframe having 6 symbols is located at the first subframe in the frame, it is able to use a super frame header structure previously defined with 6 symbols without modifying a subframe structure by succeeding to the corresponding super frame header structure. This frame configuration is just exemplary. And, the second type subframe can be located at a random subframe in the frame.

Although a last DL subframe located in a switching interval to UL from DL is a subframe constructed with 7 symbols by including an idle interval, it can be constructed with 6 symbols by allocating one symbol to an idle interval to generate a time difference necessary as a TTG interval in general.

Yet, in case that a ratio of the number of DL subframes to the number of UL subframes is (2:4), a second type subframe may be located at the last DL subframe. In this case, the last subframe is constructed with 7 symbols. In configurations except this case, a last frame can be constructed with 6 symbols irrespective of the ratio of the DL subframe number to the UL subframe number. A frame can be configured in a manner of further allocating one symbol of another second type subframe for TTG to generate a first type subframe. FIG. 20 shows a frame structure in which a second type subframe is located at a second subframe in a frame.

Figure 21:
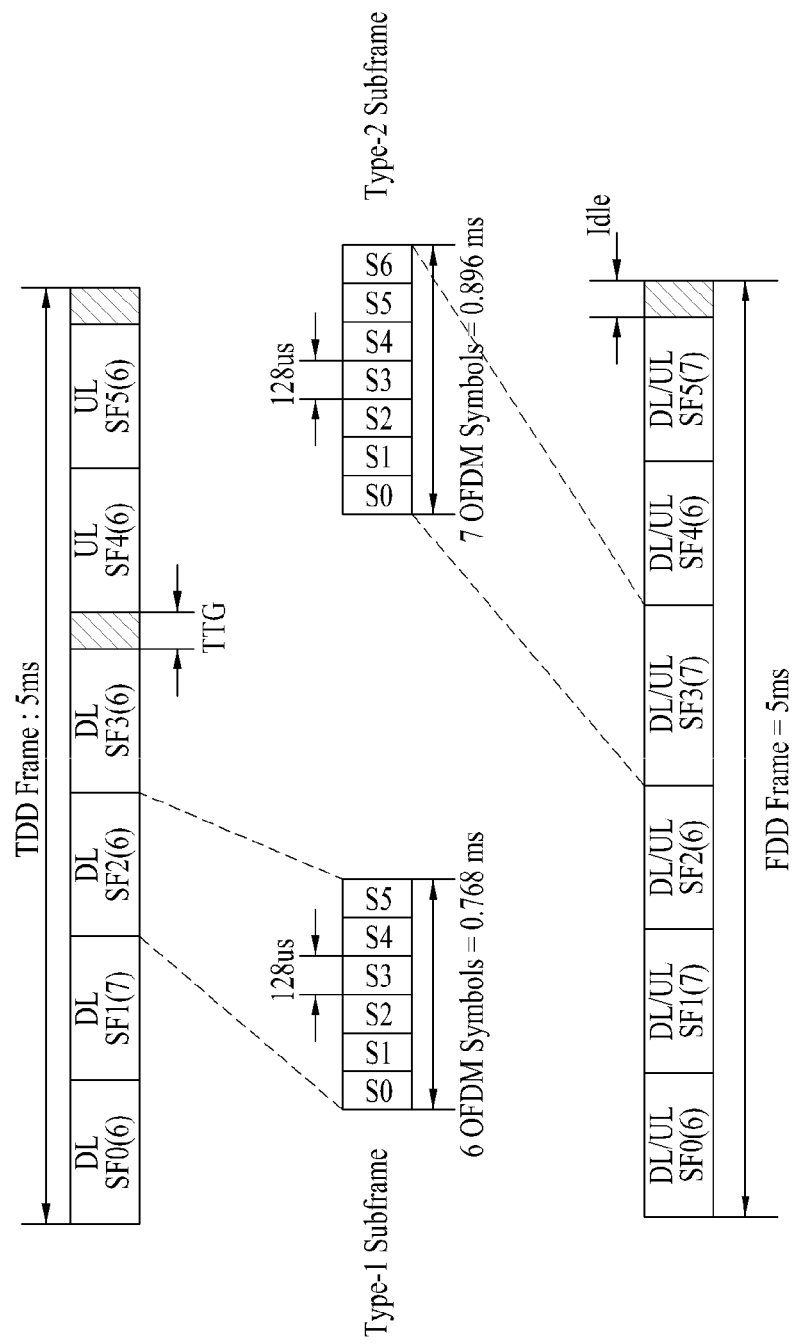
FIG. 21 is a diagram for an example of a TDD frame structure and a corresponding FDD frame structure in case that a ratio of the number of DL subframes to the number of UL subframe number is 4:2 in the TDD frame structure shown in FIG. 20.

FIG. 21 is a diagram for an example of a TDD frame structure and a corresponding FDD frame structure in case that a ratio of the number of DL subframes to the number of UL subframes is 4:2 in the TDD frame structure shown in FIG. 20.

Referring to FIG. 21, since it is unnecessary to set an additional idle interval for TTG/RTG in an FDD frame structure, it is able to configure a frame using 39 OFDMA symbols. In case that an FDD frame is constructed with 6 subframes like a TDD frame, it can be constructed with 3 first type subframes and 3 second type subframes. In this case, in order to transmit a super frame header constructed with 6 symbols, a first type subframe is preferably located at a first subframe of a frame.

It is able to transmit such additional information as sounding in a manner of allocating one additional symbol in rear of a $3^{rd}$ or $4^{th}$ subframe independently in consideration of an H-FDD frame structure or a mid-amble within the frame or arranging one symbol in rear of a last subframe of the frame. Thus, it is able to transmit a signal without modifying a previous subframe structure for data transmission.

Figure 22:
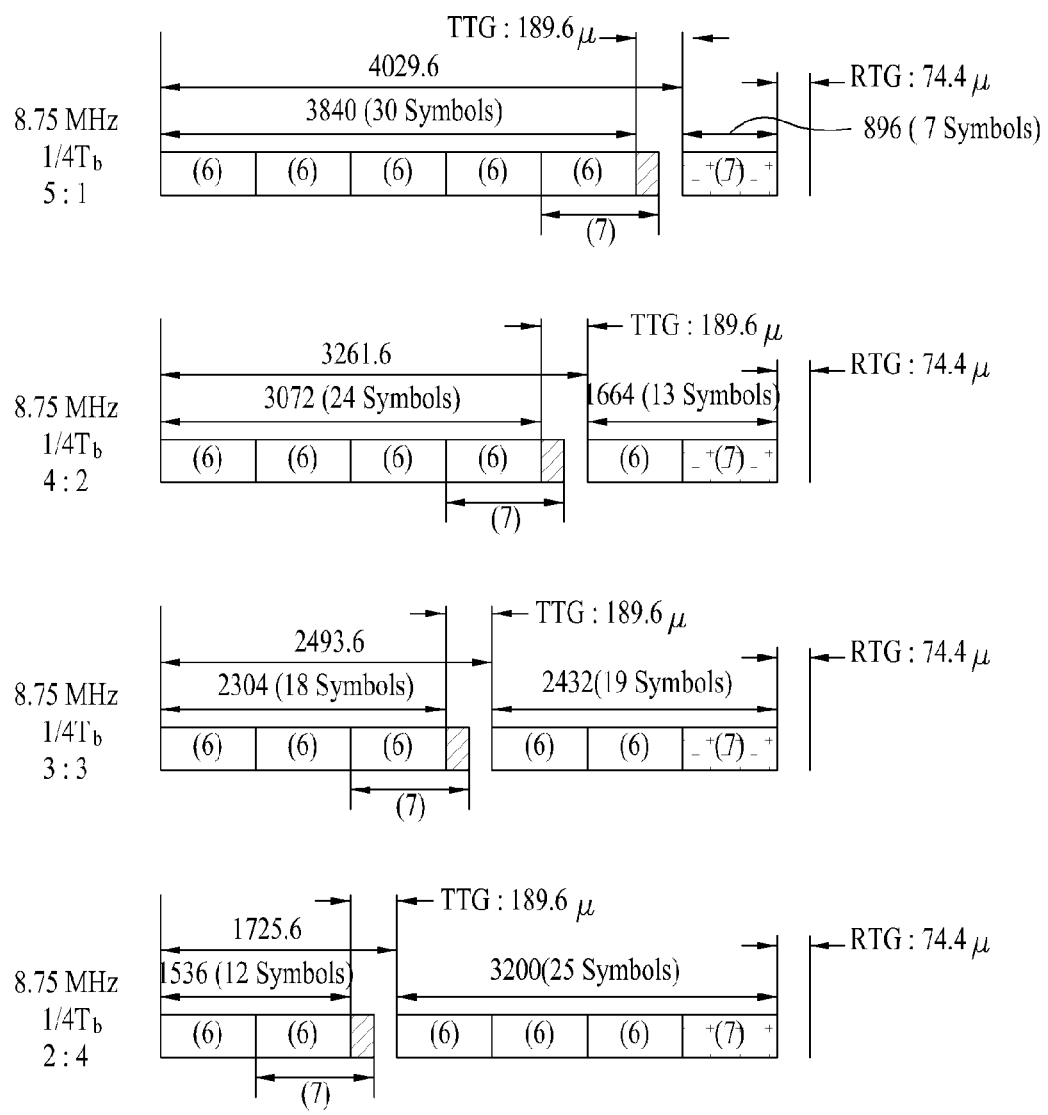
FIG. 22 is a diagram for an example of a TDD frame structure with a CP length of 1/4 Tb.

FIG. 22 is a diagram for an example of a TDD frame structure with a CP length of ¼ Tb.

First of all, a TDD frame structure shown in FIG. 22 is configured in a manner that the second type subframe located in the DL interval of the former TDD frame structure shown in FIG. 20 is located in a UL. In this case, a location of the second type subframe in the UL is non-limited. In this case shown in FIG. 22, 2 symbols are allocated as TTG/RTG interval for the switching from DL to UL like the case shown in FIG. 20. In this case, although a last DL subframe is a subframe constructed with 7 symbols, it can be constructed with 6 symbols by allocating one symbol to an idle interval to generate a time difference generally necessary for a TTG interval. This configuration is applicable irrespective of a ratio of the number of DL subframes to the number of UL subframes. Another frame can be configured in a manner of constructing a first type subframe including 6 symbols by allocating one symbol of another second type subframe existing in a frame to an idle interval. Therefore, all DL subframes can include first type subframes. And, a second type subframe is arranged at a first UL subframe to use for discrimination between DL and UL.

In the TDD frame structure shown in FIG. 22, if a ratio of the number of DL subframes to the number of UL subframes is (5:1), (4:2), (3:3), or (2:4), a ratio of the total number of symbols allocated to corresponding DL subframes to the total number of symbols allocated to corresponding UL subframes can be set to (30:7), (24:13), (18:19), or (12:25).

Figure 23:
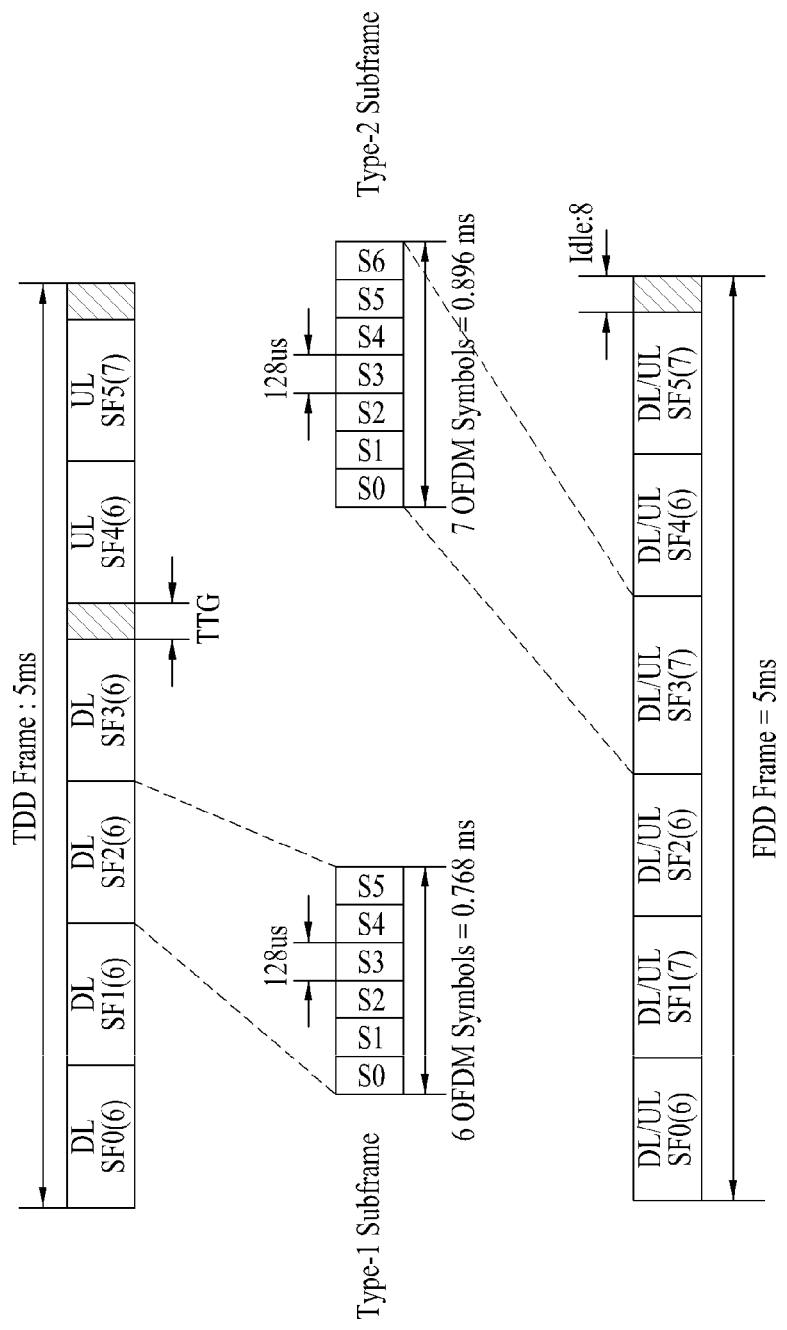
FIG. 23 is a diagram for an example of a TDD frame structure and a corresponding FDD frame structure in case that a ratio of the number of DL subframes to the number of UL subframes is 4:2 in the TDD frame structure shown in FIG. 20.

FIG. 23 is a diagram for an example of a TDD frame structure and a corresponding FDD frame structure in case that a ratio of the number of DL subframes to the number of UL subframes is 4:2 in the TDD frame structure shown in FIG. 20.

Referring to FIG. 23, a TDD frame structure for the specific ratio of TDD shown in FIG. 22 and an FDD frame structure are illustrated. In the TDD frame structure shown in FIG. 23, a second type subframe is allowed to exist in an UL region only. In particular, the second type subframe may be located at a $1^{st}$ one of UL subframes. In this case, it is able to discriminate UL and DL from each other using the second type subframe. Moreover, no limitation is put on a location of the second type subframe in UL.

In the above frame configurations described with reference to FIGS. 20 to 23, for a case that a ratio of the number of DL subframes to the number of UL subframes is (6:0), it is not necessary for a TDD frame to separately set an idle interval for DL/UL switching like the FDD frame. In this case, the TDD frame structure has the same configuration of the FDD frame structure. And, a first type subframe may be located at a $1^{st}$ subframe in a frame to transmit a super frame header constructed with 6 symbols. If so, it is able to use a super frame structure, which is defined using 6 symbols, and a control channel structure in succession without designing a new subframe structure.

Accordingly, if a frame structure with a CP length of ¼ Tb according to the present invention is designed, it is able to solve the problem that a previous TTG/RTG interval may become smaller than a TTG/RTG interval set in a frame structure with a different CP length (e.g., a CP length of ⅛ Tb, a CP length of 1/16 Tb, etc.).

Figure 24:
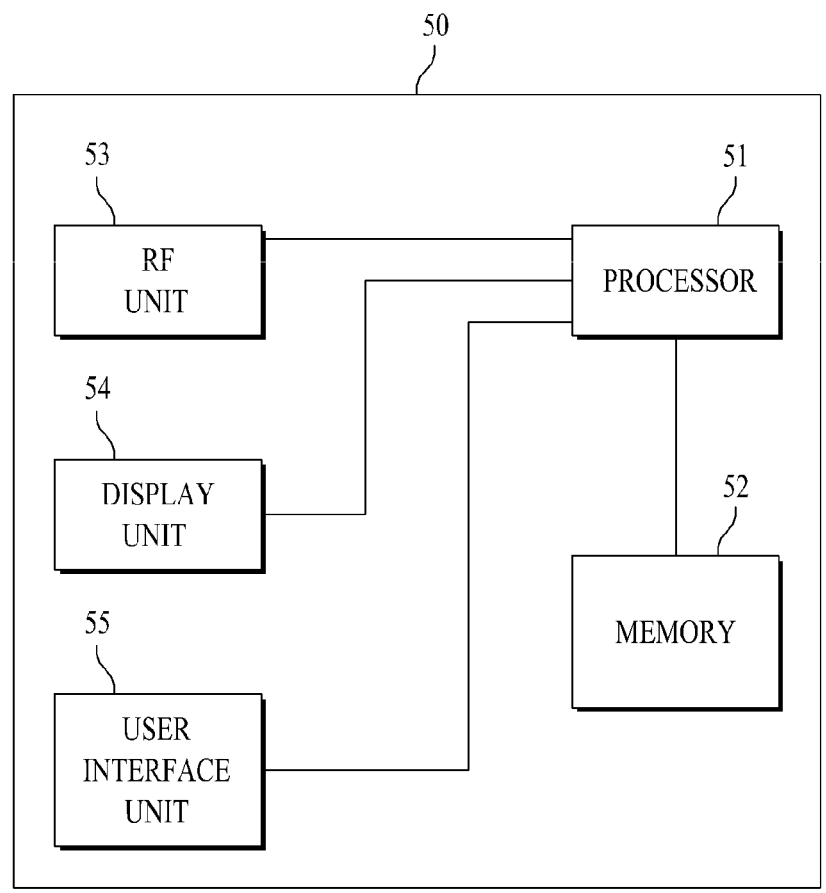
FIG. 24 is a block diagram showing constitutional elements of a device 50 that may be either the MS or the BS.

FIG. 24 is a block diagram showing constitutional elements of a device 50, that may be either the MS or the BS, and that can perform the methods of FIGS. 6 to 23. Device 50 includes a processor 51, a memory 52, a radio frequency (RF) unit 53, a display unit 54, and a user interface unit 55. Layers of the radio interface protocol are implemented in the processor 51. The processor 51 provides the control plane and the user plane. The function of each layer can be implemented in the processor 51. The processor 51 may also include a contention resolution timer. The memory 52 is coupled to the processor 51 and stores an operating system, applications, and general files. If device 50 is a MS, the display unit 54 displays a variety of information and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals. The RF unit 53 may include transmitting module, receiving module, transceiving module.

Layers of a radio interface protocol between the UE and the network can be classified into a first layer (L1), a second layer (L2), and a third layer (L3) based on the lower three layers of the open system interconnection (OSI) model that is well-known in the communication system. A physical layer, or simply a PHY layer, belongs to the first layer and provides an information transfer service through a physical channel. A radio resource control (RRC) layer belongs to the third layer and serves to control radio resources between the UE and the network. The UE and the network exchange RRC messages via the RRC layer.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Embodiments of the present invention can be implemented using various means. For instance, embodiments of the present invention can be implemented using hardware, firmware, software and/or any combinations thereof. In the implementation by hardware, one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transceiving a signal using a frame structure in a wireless communication system, the method comprising:
   transceiving the signal through a frame according to the frame structure,
   wherein the frame comprises 6 subframes, and the 6 subframes comprise at least one first type subframe, each of the at least on first type subframe having 6 orthogonal frequency division multiple access (OFDMA) symbols and at least one second type subframe, each of the at least one second type subframe having 7 OFDMA symbols,
   wherein a cyclic prefix (CP) length of each OFDMA symbol in the frame is set to ¼ of a useful symbol length, and
   wherein a channel bandwidth of the frame is set to 8.75 MHz,
   wherein a first subframe of the frame is a first type subframe among the at least one first type subframe, and a second subframe of the frame is a second type subframe among the at least one second type subframe, and
   wherein the first subframe is located at a beginning of the frame, and the first subframe is immediately followed by the second subframe.

2. The method of claim 1, wherein the frame is a time division duplex (TDD) frame or an frequency division duplex (FDD) frame.

3. The method of claim 2, wherein the TDD frame includes a downlink interval and an uplink interval subsequent to the downlink interval; and
   a first type subframe among the at least one first type subframe is located at the beginning of the uplink interval.

4. The method of claim 3, wherein:
   a transmit transition gap (TTG) is located between the downlink interval and the uplink interval in the TDD frame, and
   an receive transition gap (RTG) is located next to a last subframe of the uplink interval in the TDD frame.

5. The method of claim 1, wherein the TDD frame includes 4 first type subframes and 2 second type subframes.

6. The method of claim 2, wherein a ratio of a number of downlink subframes to a number of uplink subframes in the TDD frame is set to 5:1, 4:2, 3:3, or 2:4.

7. The method of claim 2, wherein a fourth subframe or a sixth subframe of the FDD frame is the second type subframe.

8. The method of claim 2, wherein the FDD frame includes 3 first type subframes and 3 second type subframes.

9. The method of claim 2, wherein an idle time is located next to a last subframe in the FDD frame.

10. An apparatus for transceiving a signal using a frame structure in a wireless communication system, the apparatus comprising:
    transceiving module for transceiving the signal through a frame according to the frame structure,
    wherein the frame comprises 6 subframes, and the 6 subframes comprise at least one first type subframe, each of the at least one first type subframe having 6 orthogonal frequency division multiple access (OFDMA) symbols and at least one second type subframe, each of the at least one second type subframe having 7 OFDMA symbols,
    wherein a cyclic prefix (CP) length of each OFDMA symbol in the frame is set to ¼ of a useful symbol length and
    wherein a channel bandwidth of the frame is set to 8.75 MHz,
    wherein a first subframe of the frame is a first type subframe among the at least one first type subframe, and a second subframe of the frame is a second type subframe among the at least one second type subframe, and
    wherein the first subframe is located at a beginning of the frame, and the first subframe is immediately followed by the second subframe.

11. The method of claim 2, wherein a third subframe or a fifth subframe of the FDD frame is the first type subframe.

* * * * *